(12) United States Patent
Walters et al.

(10) Patent No.: US 10,025,926 B2
(45) Date of Patent: Jul. 17, 2018

(54) SIDE-CHANNEL LEAKAGE EVALUATOR AND ANALYSIS KIT

(71) Applicant: The MITRE Corporation, McLean, VA (US)

(72) Inventors: Dan Walters, Somerville, MA (US); Andrew Hagen, Billerica, MA (US)

(73) Assignee: THE MITRE CORPORATION, McLean, VA (US)

( * ) Notice: Subject to any disclaimer, the term of this patent is extended or adjusted under 35 U.S.C. 154(b) by 327 days.

(21) Appl. No.: 14/743,787

(22) Filed: Jun. 18, 2015

(65) Prior Publication Data

US 2016/0140340 A1    May 19, 2016

Related U.S. Application Data

(60) Provisional application No. 62/082,108, filed on Nov. 19, 2014.

(51) Int. Cl.

| G06F 11/00 | (2006.01) |
| G06F 21/55 | (2013.01) |
| G06F 21/52 | (2013.01) |
| H04L 9/00 | (2006.01) |
| G09C 1/00 | (2006.01) |

(52) U.S. Cl.
CPC .......... *G06F 21/556* (2013.01); *G06F 21/52* (2013.01); *G09C 1/00* (2013.01); *H04L 9/003* (2013.01); *H04L 2209/04* (2013.01); *H04L 2209/08* (2013.01); *H04L 2209/26* (2013.01)

(58) Field of Classification Search
CPC ......... G06F 21/556; G06F 21/52; H04L 9/003

USPC ......................................................... 726/22
See application file for complete search history.

(56) References Cited

U.S. PATENT DOCUMENTS

| 8,661,536 B2 | 2/2014 | Shumow et al. |
| 8,781,111 B2 | 7/2014 | Qi et al. |

(Continued)

OTHER PUBLICATIONS

Bai, X. et al. "A Power Analysis Attack Software Simulation Platform Design and Its Applications," *2010 International Conference on Computer Engineering and Technology*, Apr. 16-18, 2010, Chengdu, China; 18 pages.

(Continued)

*Primary Examiner* — Teshome Hailu
(74) *Attorney, Agent, or Firm* — Morrison & Foerster LLP

(57) ABSTRACT

A method for analyzing side-channel leakage of an application running on a device including loading the application on a system comprising a device simulator, wherein the application is configured to accept public inputs and secret inputs and selecting a set of public inputs. The method includes, for each public input in the set of public inputs, executing the application on the system comprising the device simulator based on a respective public input and a first value for a secret input and extracting first intermediate values for the simulated device, and executing the application on the system based on the respective public input and a second value for the secret input and extracting second intermediate values for the simulated device. The method includes determining an amount of dependency of a location of the simulated device on the secret input based on a plurality of the first and second intermediate values.

37 Claims, 21 Drawing Sheets

(56) References Cited

U.S. PATENT DOCUMENTS

| | | | | |
|---|---|---|---|---|
| 2003/0108202 A1* | 6/2003 | Clapper | ............... | H04L 9/0872 380/258 |
| 2010/0017621 A1* | 1/2010 | Crawford | ............... | G06F 21/72 713/189 |
| 2010/0246808 A1 | 9/2010 | Hisakado et al. | | |
| 2012/0204032 A1* | 8/2012 | Wilkins | ................. | H04L 9/006 713/170 |

OTHER PUBLICATIONS

Bayrak, A. et al., "A First Step Towards Automatic Application of Power Analysis Countermeasures," *Proceedings of the 48$^{th}$ Design Automation Conference*, Jun. 5-10, 2011, San Diego, CA; 7 pages.

Bayrak, A. et al., (2013). "Sleuth: Automated Verification of Software Power Analysis Countermeasures," *International Association for Cryptologic Research*: pp. 293-310.

Bertoni, G. "Cryptographic Hardware and Embedeed Systems—CHES 2013," *15$^{th}$ International Workshop*, Aug. 20-23, 2013, Santa Barbara, CA; 11 pages.

Eldib, H. et al., "QMS: Evaluating the Side-Channel Resistance of Masked Software from Source Code," *51$^{st}$ Design Automation Conference*, Jun. 2-5, 2014, San Francisco, CA; 8 pages.

\* cited by examiner

Algorithm 1 Calculate mutual information with secret for each intermediate value

- 652 — Input: Target: the executable binary under analysis
- 654 — Input: Public: the input space for the Public class
- 656 — Input: Random: the input space for the Random class
- 658 — Input: SecretBits: the set of input bits that are of type Secret
- 660 — Output: Mutual information values for each system location

```
601:   for s ∈ SecretBits do
602:       L ← IDENTIFYDEPENDENCIES(s)
603:       i ← 0
604:       let P be a simple random sample of Public
605:       for p ∈ P do
606:           for all r ∈ Random do
607:               trace0_i ← RUNTARGET(p,r,s = 0,L)
608:               trace1_i ← RUNTARGET(p,r,s = 1,L)
609:               i ← i+1
610:           end for
611:       end for
612:       for c ∈ L do          ▷ Calculate MI for each dependency
613:           values0 ← (trace0[c]_0, trace0[c]_1, ..., trace0[c]_{i-1})
614:           values1 ← (trace1[c]_0, trace1[c]_1, ..., trace1[c]_{i-1})
615:           Record CALCMI(0⃗||1⃗, values0||values1)
616:       end for
617: end for
```

0x897c 1 0.000000 0.000000 0.000000 753b strb r3, [r7, #20]

0x897e 1 1.000000 1.000000 1.000000 68bb ldr r3, [r7, #8]

0x8980 1 1.000000 1.000000 1.000000 f103 0301 add.w r3, r3, #1

0x8984 1 0.000000 0.000000 0.000000 60bb str r3 [r7, #8]

0x8986 1 1.000000 1.000000 1.000000 683b ldr r3, [r7, #0]

0x8988 1 1.000000 1.000000 1.000000 f103 0304 add.w r3, r3, #4

0x898c 1 0.000000 0.000000 0.000000 681a ldr r2, [r3, #0]

0x898e 1 0.000000 0.000000 0.000000 68bb ldr r3, [r7, #8]

0x8990 1 0.000000 0.000000 0.000000 18d3 adds r3, r2, r3

0x8992 1 1.000000 1.000000 1.000000 781b ldrb r3, [r3, #0]

0x8994 1 0.000000 0.000000 0.000000 2b00 cmp r3, #0

0x8996 1 0.000000 0.000000 0.000000 d1dd bne.n 8954

0x8998 1 0.000000 0.000000 0.000000 693a ldr r2, [r7, #16]

0x899a 1 0.000000 0.000000 0.000000 687b ldr r3, [r7, #4]

FIG. 9

```
b138 :  ldrb    r0 ,  [r4 , #9]
b13c :  ldrb    r2 ,  [r1 , #8]!
b140 :  orr     r0 ,  r2 , r0 , lsl #8
b144 :  ldrb    r2 ,  [r1 , #2]
b148 :  ldrb    r1 ,  [r1 , #3]
b14c :  orr     r1 ,  r2 , r1 , lsl #8
b150 :  orr     r0 ,  r0 , r1 , lsl #16
b154 :  str     r0 ,  [sp , #12]
```

FIG. 14B

SIDE-CHANNEL LEAKAGE EVALUATOR AND ANALYSIS KIT

CROSS-REFERENCE TO RELATED APPLICATION

This application claims priority to U.S. Provisional Application No. 62/082,108, filed Nov. 19, 2014, which is incorporated by reference herein in its entirety.

STATEMENT REGARDING FEDERALLY SPONSORED RESEARCH OR DEVELOPMENT

This invention was made with Government support under U.S. Government contract FA8702-14-C-0001 awarded by the U.S. Department of the Air Force. The Government has certain rights in this invention.

FIELD OF THE INVENTION

The present disclosure relates generally to cryptographic systems and more specifically to side-channel attacks of cryptographic systems.

BACKGROUND OF THE INVENTION

Many applications and devices rely on embedded cryptographic systems to provide security for an application and its associated data. These cryptosystems are often targets of individuals attempting to gain access to the applications or devices themselves or attempting to gather information being used by the applications (e.g., credit card numbers, cryptographic keys, etc.). Early attacks on cryptosystems focused on the weaknesses of cryptographic algorithms. For example, in plaintext attacks, attackers feed known plaintext into a cryptosystem and analyze the generated ciphertext to gather information about the cryptographic algorithm being used.

As the industry developed countermeasures against these algorithm attacks, a different style of attack emerged that focused on the physical implementation of cryptosystems. Referred to as side channel attacks (SCA), these attacks attempt to derive information about the internal state of a cryptosystem by monitoring its physical characteristics such as timing, instantaneous or static power consumption, electromagnetic radiation, and perhaps others that have yet to be discovered. This "leaking" information can present a major security threat to systems performing cryptographic operations if, for example, the cryptographic key may be extracted from the leaking information derived using the side-channel attacks.

While effective SCA countermeasures are well known, they are difficult to test and verify for effectiveness. This is typically done using penetration testing: attacking an actual system incorporating a countermeasure to see if the attack difficulty increases. There are several disadvantages to this approach. First, it requires side-channel collection equipment, specific tools for each target hardware platform, and expertise to collect and analyze the data. Second, the results are often inconsistent due to the myriad parameters that can drastically affect the test results. These include the skill and experience of the tester/attacker, the choice of side-channel, environmental conditions (e.g., temperature and background electromagnetic noise), data collection equipment, and analysis techniques used. Even highly-experienced testers cannot guarantee that all potential vulnerabilities will be identified because new attacks and analysis techniques are constantly emerging. Finally, penetration testing cannot evaluate individual software or hardware countermeasures because it is difficult to isolate the effects of one from the other when studying the system as a whole.

Software based tools have been developed for evaluating SCA countermeasures. For example, Bai et al., "A power analysis attack software simulation platform design and its applications," 2010 *2nd International Conference on Computer Engineering and Technology*, vol. 6, 2010, proposed the use of hardware simulation tools to quickly evaluate hardware designs for differential power analysis (DPA) vulnerabilities by generating simulated power traces rather than collecting from real hardware. Bayrak et al., "A first step towards automatic application of power analysis countermeasures," *Proceedings of the* 48*th Design Automation Conference*, ACM, 2011, pp. 230-35, available at http://doi.acm.org/10.1145/2024724.2024778, outlined an analysis technique based on mutual information that could be used to identify vulnerable instructions by mapping samples from real power traces to their corresponding instructions. This work represented the first method that significantly deviated from penetration testing and could therefore be applied in a semi-automated manner. However, this approach still required real side-channel traces and was, therefore, hampered by all the challenges that arise from collecting side-channel data (as discussed above). Additionally, it relied on the ability to map each sample of side-channel data to the software instruction that was being executed during that time. This mapping can be challenging depending on the underlying hardware and software stack.

Other works have eliminated the need for side-channel traces by performing the analysis solely on the dataflow graph of the target program. For example, Bayrak et al., "Sleuth: Automated verification of software power analysis countermeasures," *Cryptographic Hardware and Embedded Systems—CHES* 2013, ser. Lecture Notes in Computer Science, G. Bertoni and J.-S. Coron, Eds. Springer Berlin Heidelberg, 2013, vol. 8086, pp. 293-310. available at http://dx.doi.org/10.1007/978-3-642-40349-1 17, presents a tool, called "Sleuth," that converts the intermediate representation (IR) of a target program to a data-flow graph, and then uses that graph to generate satisfiability (SAT) queries. These queries can be solved with an SAT solver to detect unmasked intermediate values that may be exploited in a side-channel attack.

Eldib et al., "QMS: Evaluating the side-channel resistance of masked software from source code," *Proceedings of the The* 51*st Annual Design Automation Conference on Design Automation Conference*, ser. DAC '14. New York, N.Y., USA: ACM, 2014, pp. 209:1-209:6. available at http://doi.acm.org/10.1145/2593069.2593193, showed that intermediate values could be partially masked and still leak information. Bayrak's Sleuth does not detect vulnerabilities related to partial or biased masking, so to address this limitation, Eldib proposed a technique for computing "quantitative masking strength" (QMS) to give a numerical score to the side-channel resistance of a countermeasure implementation.

Sleuth and QMS represent progress in automated SCA evaluation, however, both are limited in the type of leakages that they are designed to detect, and the type of programs that they are designed to analyze. The first limitation is largely due to analyzing the target program at the IR-level. Since the IR represents the program at an intermediate stage of compilation, an analysis on the IR cannot detect any vulnerabilities that may be introduced during the final stages of compilation. While previous developments have asserted that these final stages cannot generate vulnerable machine-code from protected IR, this is not true. The second limitation, which is due to the conversion of the program to a data flow graph, is that the target program must be transformed into a straight-line program that is free from conditional branches. This process involves modifying the program by loop unrolling, function in-lining, and other transformations that could potentially introduce or eliminate vulnerabilities. If any of these modifications are made to the target binary, the analysis results may not reflect the true security of the fielded system.

Effective software countermeasures against SCA are well known in theory, but in practice are difficult to implement properly due to issues such as unexpected compiler transformations and/or platform-specific leakage sources. Although several examples show that SCA is increasingly simple and inexpensive to perform as an attacker, evaluating the security of a system against SCA can still be expensive and time-consuming. Furthermore, most evaluation techniques must be performed near the end of the development schedule which adds significant risk. For example, as shown in the software development cycle (100) of FIG. 1, a software application with encryption and countermeasures is designed (101) and then implemented in code (102). The device on which the software is to be run is built and integrated with the implemented code (104). Only then is SCA security testing (106) performed. If unacceptable SCA vulnerabilities are detected (108), the process must return to the implementation step (102) followed by repetition of the build and integrate steps. This repetition can be costly and time consuming.

Accordingly, there is a need for a method of testing software for SCA vulnerabilities in a fast, inexpensive, and automated manner. The method should be able to be applied to evaluate software-based SCA countermeasures without access to source code and without the use of side-channel collection equipment.

BRIEF SUMMARY OF THE INVENTION

Described herein are methods, systems, and devices that can test a software application for SCA vulnerabilities without requiring physical hardware or side-channel collection equipment and that do not require a user to understand how to conduct a side-channel attack. The described methods, systems, and devices analyze the SCA vulnerability of an application by executing the application on a device simulator and determining whether a value of a simulated device component depends on a secret input to the application. A dependency may indicate that the application causes leaking information that, when detected by an SCA, can be exploited to extract the secret input. According to some embodiments, the application includes encryption functionality and the secret input is an encryption key. According to some embodiments, the value of a simulated device component can be a value of a register immediately after the execution of an instruction.

In some embodiments a full device simulator is used to analyze device-specific interactions that occur during application execution. The simulator can be used to determine which simulated device states depend on secret inputs and how these states are affected by countermeasures such as random inputs. Some embodiments compute a vulnerability metric for each component at each simulated execution time (e.g., clock tick). The vulnerability metric can be a statistical estimation of the extent to which a simulated device state depends on a secret value.

According to some embodiments, a method for analyzing side-channel leakage of an application running on a device includes loading the application on a system comprising a device simulator, wherein the application is configured to accept public inputs and secret inputs, and selecting a set of public inputs. For each public input in the set of public inputs, the method includes executing the application on the system comprising the device simulator based on a respective public input and a first value for a secret input and extracting first intermediate values for the simulated device, and executing the application on the system comprising the device simulator based on the respective public input and a second value for the secret input and extracting second intermediate values for the simulated device. The method includes determining an amount of dependency of a location of the simulated device on the secret input based on a plurality of the first intermediate values and a plurality of the second intermediate values.

According to some embodiments, the application is configured to encrypt the public inputs based on the secret inputs. According to some embodiments, wherein the application comprises executable machine code. According to some embodiments, the device simulator comprises a simulated processor of the device.

According to some embodiments, the secrets inputs comprise an encryption key. According to some embodiments, the public inputs comprise plaintext. According to some embodiments, the set of public inputs comprises a random sample of public inputs. According to some embodiments, the location of the simulated device comprises a component and an execution time.

According to some embodiments, the first intermediate values comprise a first value of the component at the execution time, and the second intermediate values comprise a second value of the component at the execution time.

According to some embodiments, the execution time is a clock cycle or an instruction step. According to some embodiments, determining an amount of dependency of a location of the simulated device on the secret input comprises calculating a Mutual Information Value between the location and the secret input.

According to some embodiments, the application is configured to accept random inputs, executing the application on the system based on a respective public input and a first value for a secret input comprises executing the application on the system based on a respective public input, a random input, and a first value for a secret input; and executing the application on the system based on the respective public input and a second value for the secret input comprises executing the application on the system based on the respective public input, the random input, and a second value for the secret input.

According to some embodiments, the random input comprises a side-channel leakage countermeasure.

According to some embodiments, a system for analyzing side-channel leakage of an application running on a device includes one or more processors, memory, and one or more programs, wherein the one or more programs are stored in the memory and configured to be executed by the one or more processors, the one or more programs including instructions for loading the application on a system comprising a device simulator, wherein the application is configured to accept public inputs and secret inputs, selecting a set of public inputs. The one or more programs include instructions for, for each public input in the set of public inputs, executing the application on the system comprising the device simulator based on a respective public input and a first value for a secret input and extracting first intermediate values for the simulated device, and executing the application on the system comprising the device simulator based on the respective public input and a second value for the secret input and extracting second intermediate values for the simulated device. The one or more programs include instructions for determining an amount of dependency of a location of the simulated device on the secret input based on a plurality of the first intermediate values and a plurality of the second intermediate values.

According to some embodiments, the application is configured to encrypt the public inputs based on the secret inputs. According to some embodiments, wherein the application comprises executable machine code. According to some embodiments, the device simulator comprises a simulated processor of the device.

According to some embodiments, the secrets inputs comprise an encryption key. According to some embodiments, the public inputs comprise plaintext. According to some embodiments, the set of public inputs comprises a random sample of public inputs. According to some embodiments, the location of the simulated device comprises a component and an execution time.

According to some embodiments, the first intermediate values comprise a first value of the component at the execution time, and the second intermediate values comprise a second value of the component at the execution time.

According to some embodiments, the execution time is a clock cycle or an instruction step. According to some embodiments, determining an amount of dependency of a location of the simulated device on the secret input comprises calculating a Mutual Information Value between the location and the secret input.

According to some embodiments, the application is configured to accept random inputs, executing the application on the system based on a respective public input and a first value for a secret input comprises executing the application on the system based on a respective public input, a random input, and a first value for a secret input; and executing the application on the system based on the respective public input and a second value for the secret input comprises executing the application on the system based on the respective public input, the random input, and a second value for the secret input.

According to some embodiments, the random input comprises a side-channel leakage countermeasure.

According to some embodiments, a non-transitory computer readable storage medium stores one or more programs for analyzing side-channel leakage of an application running on a device, the one or more programs include instructions, which when executed by an electronic system comprising a device simulator, cause the system to load the application on the system comprising the device simulator, wherein the application is configured to accept public inputs and secret inputs, select a set of public inputs, and for each public input in the set of public inputs, execute the application on the system comprising the device simulator based on a respective public input and a first value for a secret input and extract first intermediate values for the simulated device, and execute the application on the system comprising the device simulator based on the respective public input and a second value for the secret input and extract second intermediate values for the simulated device. The one or more programs include instructions which cause the system to determine an amount of dependency of a location of the simulated device on the secret input based on a plurality of the first intermediate values and a plurality of the second intermediate values.

According to some embodiments, the application is configured to encrypt the public inputs based on the secret inputs. According to some embodiments, wherein the application comprises executable machine code. According to some embodiments, the device simulator comprises a simulated processor of the device.

According to some embodiments, the secrets inputs comprise an encryption key. According to some embodiments, the public inputs comprise plaintext. According to some embodiments, the set of public inputs comprises a random sample of public inputs. According to some embodiments, the location of the simulated device comprises a component and an execution time.

According to some embodiments, the first intermediate values comprise a first value of the component at the execution time, and the second intermediate values comprise a second value of the component at the execution time.

According to some embodiments, the execution time is a clock cycle or an instruction step. According to some embodiments, determining an amount of dependency of a location of the simulated device on the secret input comprises calculating a Mutual Information Value between the location and the secret input.

According to some embodiments, the application is configured to accept random inputs, executing the application on the system based on a respective public input and a first value for a secret input comprises executing the application on the system based on a respective public input, a random input, and a first value for a secret input; and executing the application on the system based on the respective public input and a second value for the secret input comprises executing the application on the system based on the respective public input, the random input, and a second value for the secret input.

According to some embodiments, the random input comprises a side-channel leakage countermeasure.

BRIEF DESCRIPTION OF THE DRAWINGS

FIG. 6 is pseudocode of an application for side-channel leakage analysis according to some embodiments;

FIG. 7 is an illustration of intermediate values according to some embodiments;

FIG. 9 is an assembly view highlighting leaking instructions according to some embodiments;

FIG. 14B is an illustration of a partial listing of the "memcpy" assembly function according to some embodiments;

DETAILED DESCRIPTION OF THE INVENTION

Figure 1:
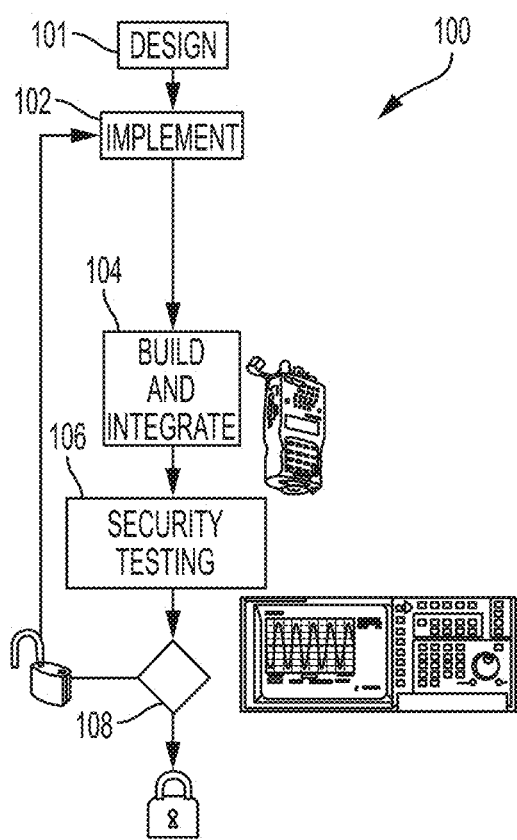
FIG. 1 is an illustration of a software application development cycle according to conventional methods.

Described herein are methods, systems, and devices that analyze the SCA vulnerability of an application by executing the application on a device simulator and determining whether a value of a simulated device component depends on a secret input to the application. A dependency may indicate that the application causes leaking information that, when detected by an SCA, can be exploited to extract the secret input. According to some embodiments, the application includes encryption functionality and the secret input is an encryption key. According to some embodiments, the value of a simulated device component can be a value of a register immediately after the execution of an instruction.

According to some embodiments, an application designed to be run on a device is loaded on a computer system that includes a simulator for the device. The application is executed based on one or more inputs that may include a secret input such as an encryption key. Values of simulated states of the device during application execution are extracted. These extracted values are used to determine the dependency of a simulated device state on a secret input. An identified dependency reflects a vulnerability to a side-channel attack to extract the secret input.

In the following description of the disclosure and embodiments, reference is made to the accompanying drawings in which are shown, by way of illustration, specific embodiments that can be practiced. It is to be understood that other embodiments and examples can be practiced and changes can be made without departing from the scope of the disclosure.

In addition, it is also to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units, but do not preclude the presence or addition of one or more other features, integers, steps, operations, elements, components, units, and/or groups thereof.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to a device for performing the operations herein. This device may be specially constructed for the required purposes, or it may comprise a general-purpose computer selectively activated or reconfigured by a computer program stored in the computer. Such a computer program may be stored in a non-transitory computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

Reference is made herein to random inputs, random samples, and other contexts incorporating the concept of randomness. A used herein, random may refers to true randomness but also to the appearance of randomness. Though a random number as referenced herein may fall short of true randomness, it may meet some statistical test for randomness that measures how unpredictable it is. For example, a random number as referenced herein may be generated by a "random number generator" or "pseudorandom number generator" based on deterministic computation. According to some contexts, a random number or a random input is the seed input of a random number generator or other "randomness" generator.

The methods, devices, and systems described herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

Described herein are embodiments of automated evaluation methods, systems, and devices, for testing software application for SCA vulnerabilities in a fast, inexpensive, and automated manner. Embodiments can be applied to evaluate software-based SCA countermeasures without access to source code (which is important for applications incorporating proprietary software libraries that are delivered pre-built). Embodiments described herein do not require physical hardware to run encrypted software or side-channel collection equipment and do not require a user to understand how to conduct a side-channel attack.

Some embodiments use a target binary (executable machine code) of an application, which is analyzed as-is without making modifications or transformations that could affect results. Some embodiments are applicable regardless of the countermeasures or algorithm implemented by the target binary, and because the source code is not needed by some embodiments, any target binary can be analyzed in the same manner regardless of the programming language used to write it. Some embodiments can detect the worst-case side-channel information leakage, making these results applicable across varying hardware platforms and capable of detecting vulnerabilities that originate from complex platform-specific behavior, without the need for a complex leakage model. Some embodiments can be used for evaluating the group of software-based countermeasures collectively known as "masking" (e.g. boolean and arithmetic masking), and some embodiments can be applied to other randomization-based countermeasures, such as shuffling the execution order of independent operations.

Some embodiments use a full system simulator to analyze platform-specific interactions that occur during program execution. The simulator can be used to determine which simulated device components, at which points during execution, depend on secret inputs and how these dependencies are affected by SCA countermeasures. This is fundamentally different from using a simulator to generate power or electromagnetic traces because rather than attempting to model the real-world side-effects of computation, only the well-defined flow of data through simulated device components is modeled, according to some embodiments. According to some embodiments, since physical leakage can originate from any simulated device component (registers, caches, memory, CPU flags, pipelines, etc.), a vulnerability metric can be determined, according to certain embodiments, for each component at each simulated execution step (e.g., clock tick). According to some embodiments, the vulnerability metric can be the mutual information between secret inputs used by the target binary and intermediate states (or values) of simulated device components. This metric can indicate the extent to which each value in the system depends on a secret value, and therefore, the extent of SCA vulnerability.

Figure 2:
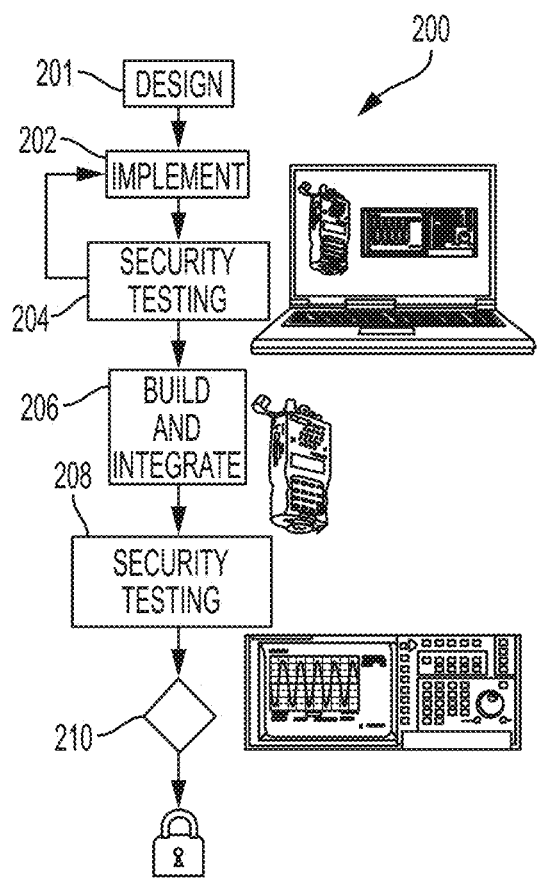
FIG. 2 is an illustration of a software application development cycle according to some embodiments.

FIG. 2 illustrates a software development cycle 200 incorporating methods according to some embodiments. At step 201, a software application that incorporates encryption is designed. For example, the application may be designed to operate an encrypted radio device for wirelessly transmitting and receiving encrypted messages. At step 202, the software application is implemented—code is written, compiled, and functionally test. At step 204, the completed application is security tested through SCA vulnerability analysis according to some embodiments described herein. The results of the analysis may be used to revise the code to correct for identified SCA vulnerabilities. The process may return to step 202 to implement code revisions. This loop may continue until the designer is satisfied with the SCA vulnerability (e.g., when the vulnerability is determined to be below a certain threshold). Once the security analysis and redesign is complete, the process advances to step 206 where the application is integrated with the physical device. At step 208, hardware security testing is performed to determine actual side-channel leakage and confirm the vulnerability of the device to side-channel attacks. Upon determination 210 that the vulnerability is below the desired threshold, the design is ready for production and/or deployment. Unlike cycle 100 (FIG. 1), cycle 200 enables testing and redesign of the application prior to costly implementation and SCA vulnerability testing on physical hardware. This can shorten the design process and reduce the amount of hardware testing.

Figure 3:
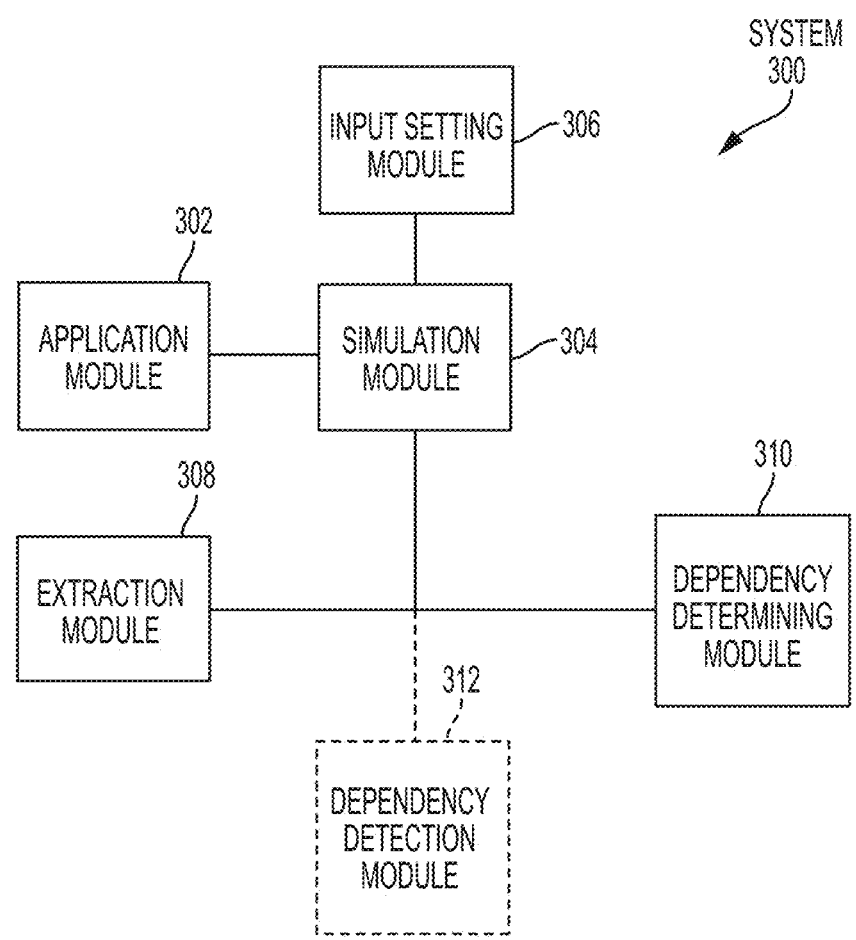
FIG. 3 is a block diagram of a system for side-channel leakage analysis according to some embodiments.
Figure 18:
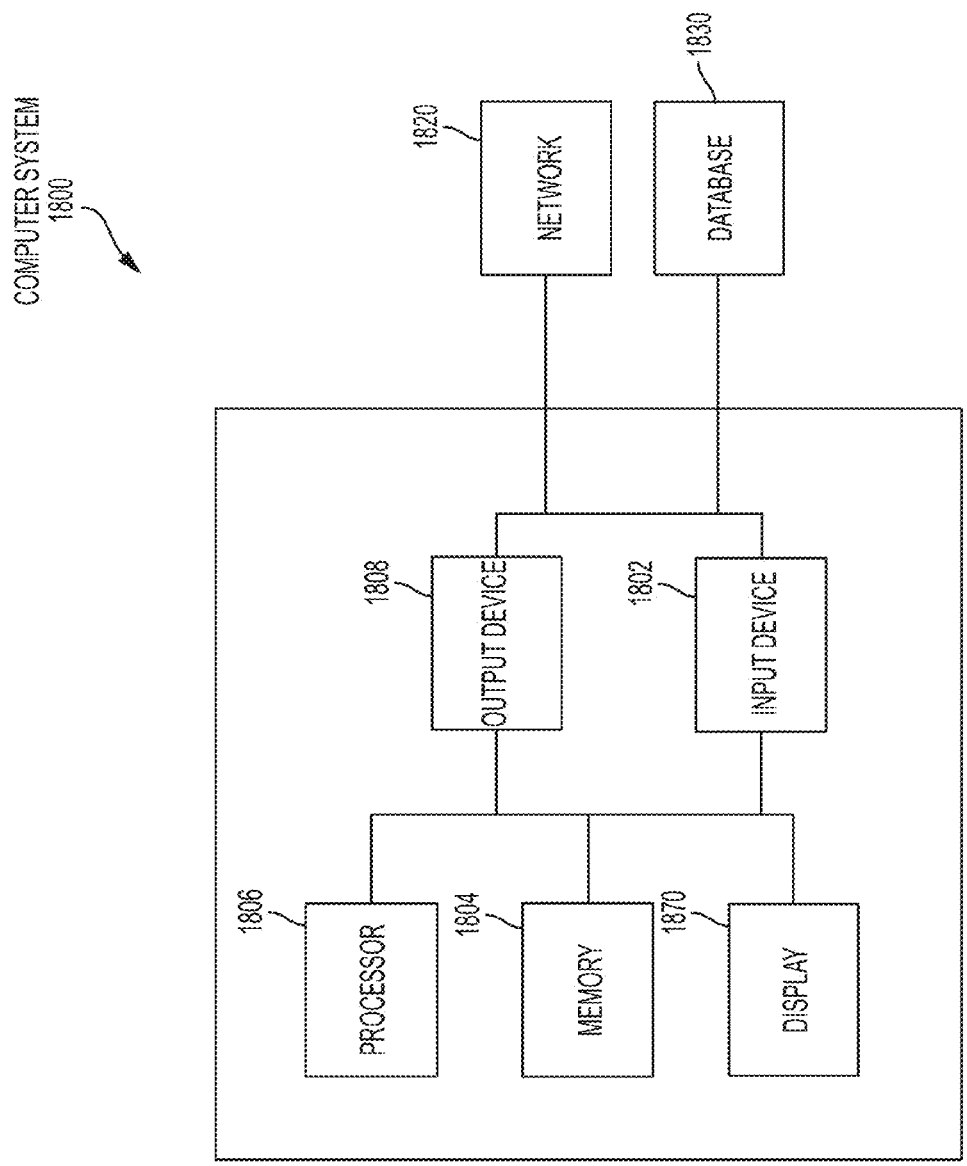
FIG. 18 is an illustration of a computing system according to some embodiments.

FIG. 3 illustrates system 300 for analyzing side-channel leakage of a software application according to some embodiments. System 300 may include one or more computing devices, such as computing device 1800 illustrated in FIG. 18. System 300 can load a software application, execute the application over a range of inputs (e.g., plaintext inputs, encryption key inputs, and SCA countermeasure inputs), and extract states of a simulated device during execution. System 300 can analyze the states to determine state dependency on the secret inputs—indicating possible side-channel leakage. System 300 includes application module 302, simulation module 304, input setting module 306, extraction module 308, and analysis module 310. Application module 302 stores and manages the application to be tested for side-channel leakage. Simulation module 304 includes a device simulator for simulating a hardware device on which the application is to operate, executing the application on the simulated device, and enabling access to simulated device states during execution. Input setting module 306 enables the setting of inputs of the executed application through simulation module 304. Extraction module 308 extracts the states of the device simulated by simulation module 304. Analysis module 310 determines the vulnerability of device locations based on information about the system from the simulation module 304 and the device states extracted by extraction module 304.

Application module 302 stores and manages the application being tested for side-channel attack vulnerabilities. According to some embodiments, application module 302 may store the executable binary of the application (also referred to herein as "target binary"), which is the compiled, machine-code, executable program. According to some embodiments, the application includes an interface for setting inputs to the application. Inputs may include secret inputs, public inputs, and random inputs. Secret inputs are meant to be kept hidden from an attacker. For example, a secret input may be an encryption key that the application uses to encrypt data. Public inputs are inputs that may be revealed to an attacker without consequence, such as plaintext that is intended to be transformed into ciphertext by the application. Random inputs are inputs that are used as a source of entropy or randomness for masking or other side-channel leakage countermeasures.

An application to be tested for SCA vulnerability may include encryption functionality. For example, the application may employ encryption methods such as symmetric encryption, asymmetric encryption, stream cipher encryption, block cipher encryption, and/or others. The application may include encryption algorithms such as Data Encryption Standard (DES), Triple DES, Advanced Encryption Standard (AES), International Data Encryption Algorithm (IDEA), etc. The methods, systems, and devices described herein, including system 300 are generally not limited by the type of encryption used in the application.

The application may include functionality in addition to encryption. For example, the application may include the operating system for an encrypted communication device. According to some embodiments, the application may be an encryption module designed to interface with other applications in a system. For example, the encryption module may accept plaintext from another module within a system as input and output ciphertext to some other module within the system.

Simulation module 304 can provide software-based simulation of a hardware implementation. Simulation module 304 generates a simulated device, loads the application to be tested on system 300, and executes the application on system 300. Execution of the application on system 300 includes executing the application on the simulated device generated by simulation module 304. According to some embodiments, simulation module 304 can allow access to states of the simulated device during execution of the application. States of the simulated device are values of simulated device components at a given point in execution. For example, according to some embodiments, a state may be the value of a simulated device register at an execution time. The term device component is a generic reference to a simulated device hardware component, property, or parameter of interest. For example, a device component may reflect an actual hardware component such as a register, a memory bank, a cache, etc., where the state of the device component is its digital value at a given point in time. According to other embodiments, a device component refers to a simulated device property, such as power consumption, electromagnetic radiation, or acoustic radiation. According to some embodiments, states can be accessed during execution and, according to other embodiments, simulation module 304 stores the states of the simulated device during execution for later retrieval and analysis.

According to some embodiments, the simulator in simulation module 304 is a full system simulator designed to emulate the real-world execution of the application. According to some embodiments, the simulator can be a partial system simulator that models only portions of the real-world execution of the application. According to some embodiments, the simulation module provides access to all components of the simulated device's states, including the registers, memory, and caches. According to some embodiments, the simulation module provides access to some subset of components of the simulated device's states, such as only the registers.

Figure 4:
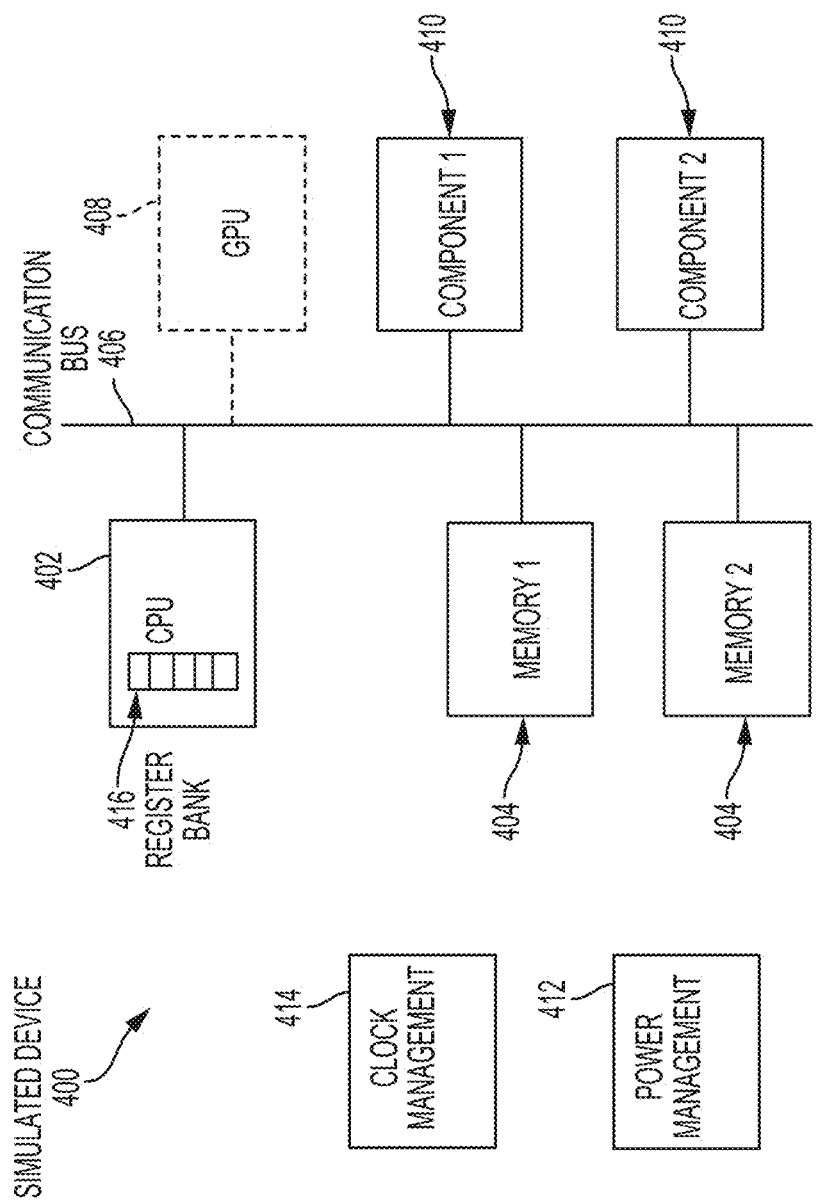
FIG. 4 is a block diagram of a hardware simulator according to some embodiments.

An example of a simulated device provided and managed by simulation module 304 according to some embodiments is illustrated in FIG. 4. Simulated device 400 may emulate actual hardware implementation of a device on which the application is designed to run. A device may be a radio, a computer, a microcontroller, an FPGA, a missile guidance system, a satellite, or any other hardware that incorporates electronic communication. Simulated device 400 can include one or more central processing units (CPU) 402, one or more memories 404, one or more communication buses 406, one or more graphics processing units 408, power management module 412, clock management module 414, and one or more additional components 410. Examples of additional components are caches, external storage devices, analog-to-digital converters, and communication units. One or more central processing units 402 can be configured to emulate off-the-shelf processors such as Intel Core2® processor, Intel Core2 Quad® processor, AMD Phenom Quad-Core® processor, Qualcomm Snapdragon 600® processor, ARM Cortex A9® processor, a MIPS® processor, a PowerPC® processor, an ALPHA® processor, etc. Other components of simulated device 400 can also be configured to emulate off-the-shelf components. Components of simulated device 400 may also be configured to emulate components specially designed for the device or system for which the application is designed, such as ASICs or specially designed FPGAs.

According to some embodiments, simulated device 400 can provide information about each simulated device component during execution of the application. For example, simulated device 400 can provide the values of one or more registers 416 in CPU 402 at a given time. According to some embodiments, a given time may be a given clock cycle or a given instruction step. Simulated device 400 may provide the clock values of clock management module 414, the power draw of power management module 412, the values of memory locations in one or more memories 404, the values of one or more components 410, the values of sub-components of GPU 408, the values of various locations of communication bus 406, etc., at a given time.

Referring to back FIG. 3, input setting module 306 is used by system 300 to set inputs to the application loaded and executed on simulation module 304. Input setting module 306 can be used to set public inputs, secret inputs, and random inputs for the application. Input setting module can also be used to define the category—public, secret, or random—that a given input belongs to. According to certain embodiments, input setting module 306 includes a graphical user interface (e.g., displayed on display 1870 of FIG. 18) configured to provide a user the ability to manually set an input. According to other embodiments, the input setting module is configured to automatically generate given inputs and provide the inputs to the simulation module for inputting to the application. For example, according to some embodiments, the input setting module is configured to choose a set of public inputs. According to some embodiments, input setting module 306 can be configured to choose a set of public inputs based on a random sample of public inputs. For example, where an application to be evaluated for SCA vulnerability operates on 128-bit blocks of plaintext input, input setting module may provide these input blocks by choosing random samples from all possible inputs within the 128-bit input space128-bit.

Extraction module 308 can extract the states of the simulated device from simulation module 304. For example, extraction module 308 may extract the values of registers of a simulated processor (e.g., registers 416 of CPU 402) at each instruction during execution of the application by simulation module 304. According to other embodiments, extraction module 308 extracts states by simulated CPU clock tick, for example, at every clock tick, at every tenth clock tick, at every hundredth clock tick, etc. According to some embodiments, extraction module 308 may extract states of the simulated device as the simulated device executes the application. According to other embodiments, the states of the simulated device during execution are stored by simulation module 304 during execution and the extraction module 308 extracts the states after the execution is completed. The extraction module collects states from a plurality of runs (executions).

According to some embodiments, the states extracted by extraction module 308 are derived by a leakage model. A leakage model specifies the observable information that leaks via side-channels. A leakage function can take the state of the simulated device as input and return a value (or set of values) that represents the information that is observable from side-channels based on the leakage model. Various leakage functions may be used according to some embodiments, including general functions that make very few assumptions about the specific way in which the physical hardware that is being simulated will leak information. For example, the identity leakage function takes the state of the machine as input and returns the entire state as output (e.g., a vector of the values held by the system registers). This function is both conservative and generic because it assumes that the exact value held by any individual component in the system can be revealed by a side channel.

Examples of other leakage models according to some embodiments are the Hamming-weight model, which assumes that the power consumption varies according to the Hamming weight (i.e., the number of non-zero bits in a given bit-string) of the manipulated data or the executed instruction, and the Hamming-distance model, which considers the number of flipping bits in the current state compared with the previous state. Various other models can be used for different technologies and processors.

Analysis module 310 determines dependent states of a simulated device on a given input based at least in part on one or more states extracted by extraction module 308. For example, analysis module 310 may compare the value of a simulated device component at a given instruction step for a given set of inputs with the value of the same simulated device component at the same instruction step for a different set of inputs to determine the dependency of the value of that component on one or more of the inputs. For example, where the value taken by a given simulated device component (e.g., a register of CPU 402) during an instruction step depends on the value of an input (e.g., a secret input), analysis module 310 may provide a measure of that dependency. The measures of dependencies determined by analysis module 310 can provide side-channel leakage vulnerability information. For example, where the value taken by a given simulated device component at a given instruction is highly dependent on the value of a secret input to the application, the instruction that sets that value may create an SCA vulnerability.

System 300 may also include dependency detection module 312. Dependency detection module 312 may provide optimization to system 300 to reduce the number of system states that are monitored by simulation module 304, extraction module 308, and/or analysis module 310. For example, dependency detection module 312 may initiate, control, and/or monitor initial executions of the application on the simulated device to determine which simulated device components are affected by a change in an input. For example, the application may be executed on the simulated device with a given secret input bit set to 0 and then executed again with the given secret input bit set to 1 and dependency detection module 312 may then compare the values of systems components between the two executions to determine which were affected by the change in the secret input value. Those that were not affected may not be further monitored by extraction module 308 and/or included in the dependency determinations of dependency determination module 310.

Figure 5:
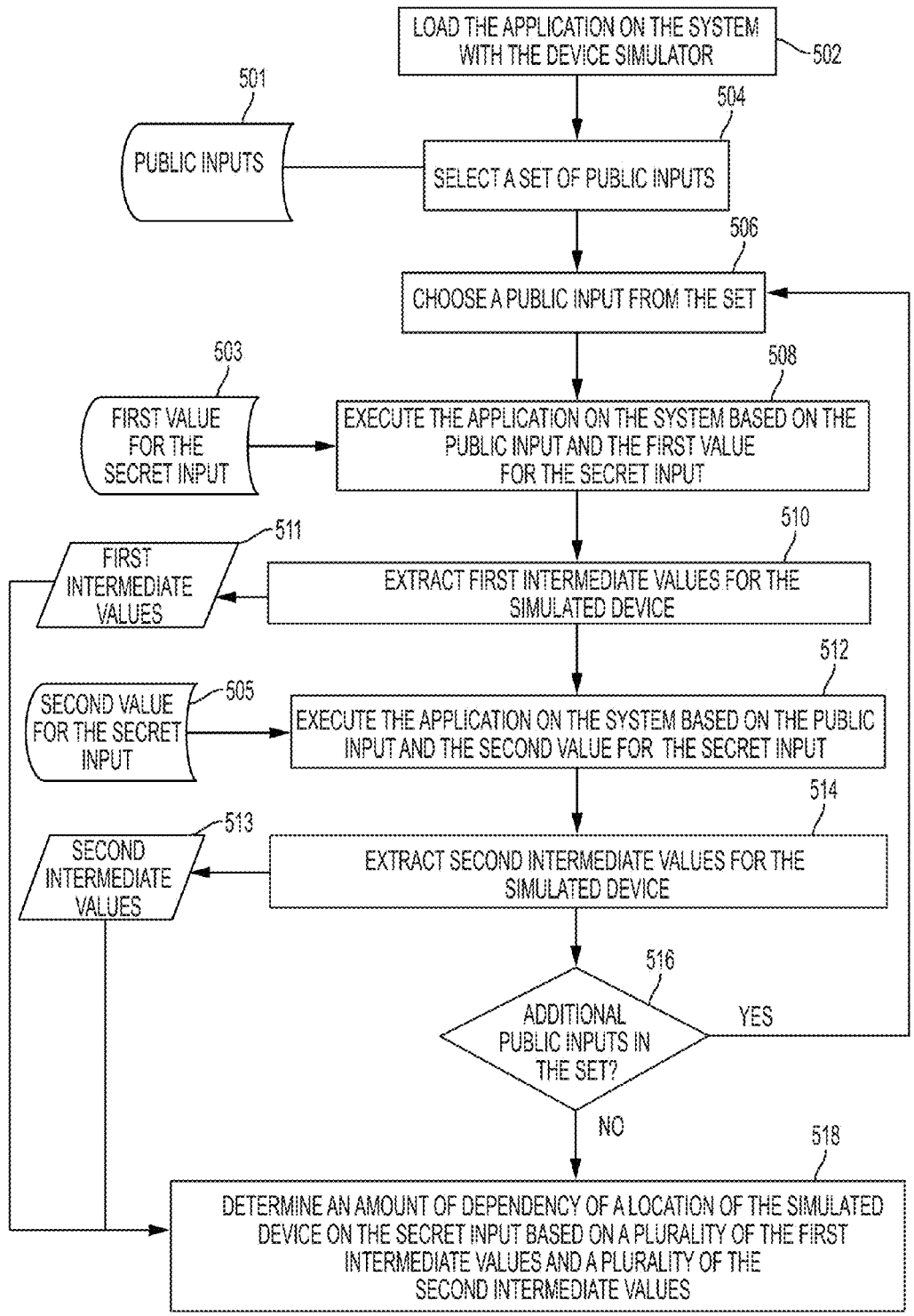
FIG. 5 is a process flowchart of a method for side-channel leakage analysis according to some embodiments.

FIG. 5 is an illustration of method 500 for analyzing SCA vulnerability according to some embodiments. Method 500 is performed by a computing system with a processor and a memory (e.g., the computing system 1800 illustrated in FIG. 18). Method 500 may be included in one or more programs stored in the memory that, when executed by the processor, cause the computing device to perform method 500. According to certain embodiments, the processor may be a general purpose processor or it may be specially selected for executing method 500. Example of general purpose processors according to certain embodiments are single-core or multi-core microprocessors such as, for example, Intel Core2® processor, Intel Core2 Quad® processor, AMD Phenom Quad-Core® processor, a MIPS® processor, a PowerPC® processor, an ALPHA® processor, etc. Examples of processors that may be specially selected according to certain embodiments include digital signal processors or graphics processing units. Method 500 may require extensive computations on large sets of data and such special purpose processors are known to handle such complex computations and large amounts of data well. In some embodiments, method 500 is executed on a multi-core processor that enables parallel processing for faster computation times. In some embodiments, method 500 is executed on multiple processors in parallel, enabling faster computation time.

At step 502, the application being tested for side-channel attack vulnerabilities is loaded on a system (system 1800) with a device simulator. The application is configured to accept public inputs and secret inputs. At least some portion of the application includes encryption functionality for encrypting public inputs using the secret inputs. The public inputs may be, for example, plaintext. The secret inputs may be an encryption key.

At step 504, a set of public inputs is selected. According to some embodiments, the set of public inputs is selected based on a random sample of some group of public inputs 501. For example, where the application is configured to operate on 128-bit blocks of plaintext and a group of public inputs 501 is a string of plaintext, the set of public inputs may include a plurality of 128-bit blocks chosen randomly from the string. According to some embodiments, the set of public inputs includes the entire group of public inputs (e.g., the entire string of plaintext).

At step 506, a public input from the set is chosen. At step 508, the application is executed on the system based on the chosen public input and a first value for a secret input 503. According to some embodiments, the secret input is a bit of an encryption key (e.g., a bit of an 8 bit encryption key). The value of the secret bit may be 0 or 1. Executing the application on the system includes simulating the device with the device simulator and executing the application or a portion of the application on the simulated device.

At step 510, first intermediate values 511 for the simulated device are extracted. The intermediate values can be values of simulated device locations during application execution. According to some embodiments, a value of a location includes the value of a simulated device component at a given execution step. For example, an intermediate value may be the digital value taken by a system register at the end of an execution step. According to some embodiments, an intermediate value may include the power usage of the system as a whole or of one or more simulated device components at an execution step. According to some embodiments, an execution step is the execution of a single instruction. According to other embodiments, an execution step is a processor clock tick. Other execution steps are contemplated such as some predetermined pattern of instruction steps or clock ticks (e.g., every other, every tenth, etc.).

At step 512, the application is executed on the system based on the chosen public input and a second value for a secret input 505. According to some embodiments, where the secret input is a bit of an encryption key, the second value for the secret bit may be 1 where the first value 503 is 0. At step 514, second intermediate values 513 for the simulated device are extracted. The second intermediate values 513 are values of locations during execution of the application with the second value for the secret input. According to some embodiments, the second intermediate values correspond to the first intermediate values. For example, where the first intermediate values include the value of a given register at a given execution step, the second intermediate values also include the value of the given register at the given instruction step (based on the secret bit set to 1 instead of 0, for example). Executing the application on the system includes simulating the device with the device simulator and executing the application or a portion of the application on the simulated device.

At step 516, if additional public inputs are in the set of public inputs, the process returns to step 506 to execute the application and extract intermediate values based on a next public input in the set of public inputs.

According to some embodiments, once the application has been executed and intermediate values extracted for all public inputs in the set of public inputs, the process advances. At step 518, an amount of dependency of a location of the simulated device on the secret input is determined based on a plurality of the first intermediate values and a plurality of the second intermediate values. For example, the value of a simulated device component at a given instruction step for a given set of inputs may be compared with the value of the same simulated device component at the same instruction step for a different set of inputs to determine the dependency of that location on one or more of the inputs. For example, where the value taken by a given simulated device component (e.g., a register) during an instruction step depends on the value of an input (e.g., a secret input), a measure of that dependency may be determined in step 518. The measure of dependencies can provide side-channel leakage information. For example, where the value taken by a given simulated device component at a given instruction is highly dependent on the value of a secret input to the application, the instruction may create a vulnerability to side-channel leakage detection and exploitation through an SCA. According to some embodiments, dependencies are determined for only one location and according to other embodiments, dependencies are determined for multiple locations.

According to some embodiments, steps 502 through 518 are repeated for multiple secret inputs. For example, according to some embodiments the steps are repeated for each bit of an encryption key. According to some embodiments, the steps are repeated for multiple but not all bits of an encryption key.

According to some embodiments, dependencies are determined using a Mutual Information (MI) measure. MI is a measure of the mutual dependence between two random variables (RV), measured in bits. In computing systems, values under consideration are discrete, finite values and so are represented by discrete RVs. For two discrete RVs, X and Y, the mutual information is defined as:

$$I(X;Y) = \sum_{y \in Y} \sum_{x \in X} p(x,y) \log\left(\frac{p(x,y)}{p(x)p(y)}\right)$$

where p(x,y) is the joint probability distribution of X and Y and p(x) and p(y) are the marginal probability distributions for each of X and Y. Given this definition, it can be seen that if the random variables are independent then:

$$p(x,y)=p(x)p(y)$$

and the MI is exactly zero. Furthermore, the MI of two random variables is always non-negative. A zero MI indicates that no information about one variable can be obtained from observing the other. The greater the value of the MI, the more the two variables depend on each other and the more information one reveals about the other.

Other measures of statistical dependency can be used. For example, some embodiments can use pearson correlation, conditional entropy, kolmogorov-smirnov test, and many others.

According to some embodiments, where the amount of dependency of a location on a secret input is some non-zero number, the location is determined to be a leakage location. A leakage location is a location that leaks secret information: MI(V,S)>0 for a location, V, and secret input, S. A leakage location may be specified by the associated simulated device component name (e.g., Register-3) and point in execution time (e.g., clock tick 1 million or instruction 5).

According to some embodiments, where the amount of dependency of a location on a secret input is zero, the location is perfectly masked. A location is perfectly masked if it is statistically independent of the secret input. This definition is equivalent to stating that the MI between the location and the secret input is zero. The degree to which an intermediate value is not perfectly masked is given by the magnitude of the MI.

Methods, according to some embodiments, can detect leakage locations in applications that include some side-channel attack countermeasures, such as masking. Countermeasures may operate by introducing some entropy or randomness (or pseudorandomness) into the application's encryption process. The application can be configured to accept random inputs that are used to create this randomness. In such embodiments, the above described method 500 may be augmented by introducing the random inputs into the execution and extraction process. For example, at each execution step 508 and 512, the application is executed on the system based on the public input, a random input, and the secret input value. The process may iterate until the application has been executed over all combinations of public inputs in the set of public inputs, random inputs, and secret input values. According to some embodiments, the random input space may be too large to run over all possible random inputs and a random sampling of random inputs can be used to reduce the number of application executions.

Pseudocode for method 600 according to some embodiments is illustrated in FIG. 6. Method 600 includes identifying a set of locations that may exhibit side-channel leakage vulnerability and quantifying the vulnerability by calculating the MI between each location and each bit of a secret input. Method 600 includes several inputs, such as the target binary 652, public inputs 654, random inputs 656, and secret inputs 658. Target binary 652 is executable binary machine code for an application being tested for SCA vulnerability. Target binary 652 accepts public inputs, random inputs, and secrets inputs to produce encrypted data. Method 600 generates output 660, which includes MI values for each side-channel leakage location.

At line 601, a loop is initiated for each bit, s, in the secret inputs 654. At line 602, a subroutine (IdentifyDependencies) is run to identify the locations that depend on the secret bit in the given loop. A location may include a simulated device component at a given execution time. For example, a location may be CPU register 2 at instruction 5. Line 602 is an optional optimization (IdentifyDependencies) that may reduce the number of simulated device components that are tracked and used in later calculations. According to some embodiments, the IdentifyDependencies subroutine is implemented by running target binary 652 twice (once with the secret bit set to 0 and again with it set to 1) and contrasting the intermediate values from the two runs. According to some embodiments, this technique may not capture all possible dependencies, and therefore, a more thorough dependency check may be performed. For example, IdentifyDependencies could be run multiple additional times while setting other input bits to different values. According to some embodiments, a more advanced dependency check includes a data flow graph along with an SAT (satisfiability) solver to solve for the input combinations that create a dependency. This techniques can find the input combinations that create a dependency. The method could then be performed with those inputs to find where in the machine the dependency manifests itself. According to some embodiments, the optimization step of line 602 is not utilized.

At line 603, a counter is initialized. The counter is used to index the intermediate values generated during the loops of a given secret bit. At line 604, a set of public inputs is selected. The set, P, may be a random sample of public inputs 654.

At line 605, a loop is initiated for each public input, p, in the set of public inputs. At line 606, a loop is initiated for each random input, r, of the random inputs 656. At line 607, the target executable is run over the secret bit, s, the public input, p, and the random input, r, with the secret bit, s, set to 0. This results in an $i^{th}$ collection of first intermediate values for the secret bit, s, equal to 0. This set of first intermediate values is also called a trace and may be used to calculate the mutual information and determine the amount of dependence between locations and each secret bit. If the optimization subroutine was executed at line 602, this collection will include only the intermediate values for the identified dependencies (identified locations). At line 608, the target executable is run, again, over the secret bit, s, the public input, p, and the random input, r, but this time with the secret bit, s, set to 1. This results in an $i^{th}$ collection of second intermediate values (a trace) with the secret bit, s, set to 1. If the optimization subroutine was executed at line 602, this collection will include only the intermediate values for the identified dependencies. At line 609, the index is incremented. The steps beginning at line 605 repeat over all public inputs in the set of public inputs and all random inputs.

At line 612, a loop is initiated for each location identified by the optimization subroutine IdentifyDependencies at line 602. If the IdentifyDependencies subroutine was not used, the loop is initiated for all locations (e.g., all registers and all execution points). At line 613, the first intermediate values for a given location with the secret bit set to 0 for all public inputs in the set of public inputs and all random inputs are collected into a first set of intermediate values. At line 614, the second intermediate values for a given location with the secret bit set to 1 for all public inputs in the set of public inputs and all random inputs are collected into a second set of intermediate values.

At line 615, the MI for the locations (or set of locations, e.g., as identified by IdentifyDependencies) is calculated based on the first and second sets of intermediate values. At line 616, this iteration completes and the process returns to line 612 for processing a next location. The foregoing steps beginning at line 604 can repeat for each secret bit of the secret input 658. Those locations with an MI greater than zero are leakage locations that present potential SCA vulnerabilities.

Method 600 may be performed for multiple secret inputs. For example, where an application is designed to operate with a 128-bit encryption key, method 600 may be performed once for each of the 128 bits. According to some embodiments, method 600 is performed for a random sample of the secret input space, which could produce a range of leakage metrics detected at each leakage location.

Figure 7:
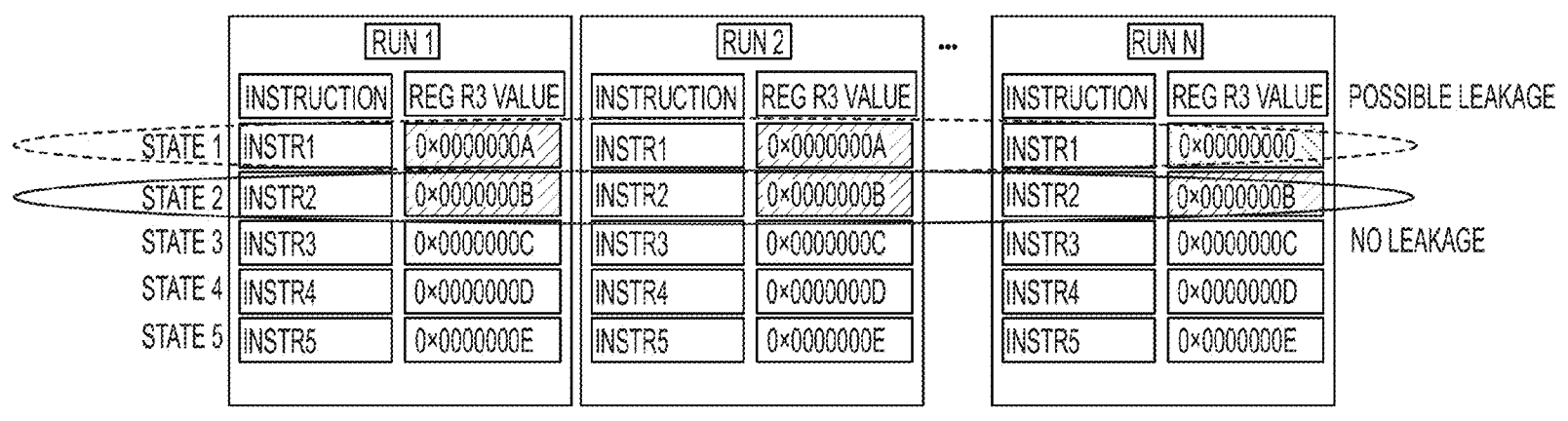

FIG. 7 is an example of intermediate values that can be generated and extracted by methods according to some embodiments (e.g., method 500 and/or method 600). The intermediate values for register R3 are provided for 5 instruction steps across three runs. Each run represents a unique combination of inputs. For example, a unique combination of a public input, a random input, and a secret input. To further illustrate, Run 1 may be based on a given public input, a given random input, and a given secret bit set to 0, Run 2 may be based on the given public input, the given random input, and the secret bit set to 1, and Run N may be based on the given public input, a different random input, and the secret bit set to 0.

Each combination of a simulated device component (e.g., register R3) and an instruction step (e.g., INSTR1) is a location (also referred to as a system state). A location may be a leakage location if its value is dependent, at least to some degree, on a secret input. In other words, if the values of a location (intermediate values) vary with the value of a secret input, then the location is a leakage location.

As illustrated by each run in FIG. 7, the intermediate values taken on by register R3 change from instruction to instruction. For example, for Run 1, at instruction INSTR 1, register R3 takes on a value of 0x0000000A and then at instruction INSTR 2, the value changes to 0x0000000B. From one run to the next, the value of register R3 at a given instruction step may be the same or it may be different. For example, the intermediate value at each instruction step is the same when comparing Run 1 and Run 2. However, the intermediate value at instruction step INSTR1 for Run N is different from the values taken at the same instruction step in Run 1 and Run 2 (0x00000000 versus 0x0000000A).

Therefore, the location of register R3 at instruction step INSTR1 may be a leakage location because its value varies from one run to the next. This does not necessarily mean that register R3 at instruction step INSTR1 is a leakage location because its value may not reveal (or leak) information about the value of the secret input (e.g., as determined by the MI value). For example, if the value of register R3 at instruction step INSTR1 is also dependent on the random input, then the dependency of register R3 at instruction step INSTR1 on the secret input may be hidden. As another example, if a leakage model is applied that causes some information to be lost then the dependency of register R3 at instruction step INSTR1 on the secret input may be hidden. The intermediate values at instruction step INSTR2 are uniform across the runs (0x0000000B), and therefore, register R3 at instruction step INSTR2 is not a leakage location.

Computational Complexity

According to some embodiments, the mutual information is calculated over all possible public, secret, and random inputs. According to some embodiments, these calculations quickly become infeasible if there are many possible inputs, which is commonly the case for cryptographic algorithms. According to some embodiments, performing this calculation over a random subset of inputs yields results that closely approximate the true result (the result obtained if the mutual information is calculated over all possible public, secret, and random inputs), provided that the subset is sufficiently large. According to some embodiments in which the analyzed application includes AES implementations, a mutual information estimate rapidly converges to the true value, requiring only a subset of the possible input values. While not being bound by any theory, this fast convergence may be partly due to properties of certain cryptographic algorithms, and in particular, substitution permutation networks such as AES. For example, for a common set of operations in AES—a secret and public value XORed together and used as a lookup into an s-box table—the public value can be denoted p and the secret bits can be divided into the bit that is being tested, denoted k', and the rest of the bits, k, with the full secret value being the XOR of the two parts: k'⊕k. The result of the s-box lookup can then be written as:

$$sbox[(k'\oplus k)\oplus p] = sbox[k'\oplus(k\oplus p)]$$

Thus, as long as the subset of chosen inputs result in the values of k⊕p spanning a sufficiently large subset of the possible values, the mutual information of the s-box output will closely approximate that from a full sweep of the inputs.

Evaluation and Analysis Tool

According to some embodiments, an evaluation and analysis tool incorporates execution, extraction, and dependency determination steps as described above and provides an interface for interacting with and analyzing the resulting information (e.g., MI values for locations). According to some embodiments, the tool uses a Gem5 simulator, an open-source, full system simulator, to emulate the execution of the application being analyzed (e.g., the target binary of the application being analyzed). Any other simulator may be used provided that it supports inspection of the states of the simulated device (e.g., GEMS, Imperas, MARSSx86, Simics, SST, etc.). Gem5 provides this access to all components of the simulated device's states, including the registers, memory, and caches. According to some embodiments, all of these components are analyzed as sources of side-channel vulnerabilities, and according to other embodiments only some of these components are analyzed (e.g., only registers).

Figure 8:
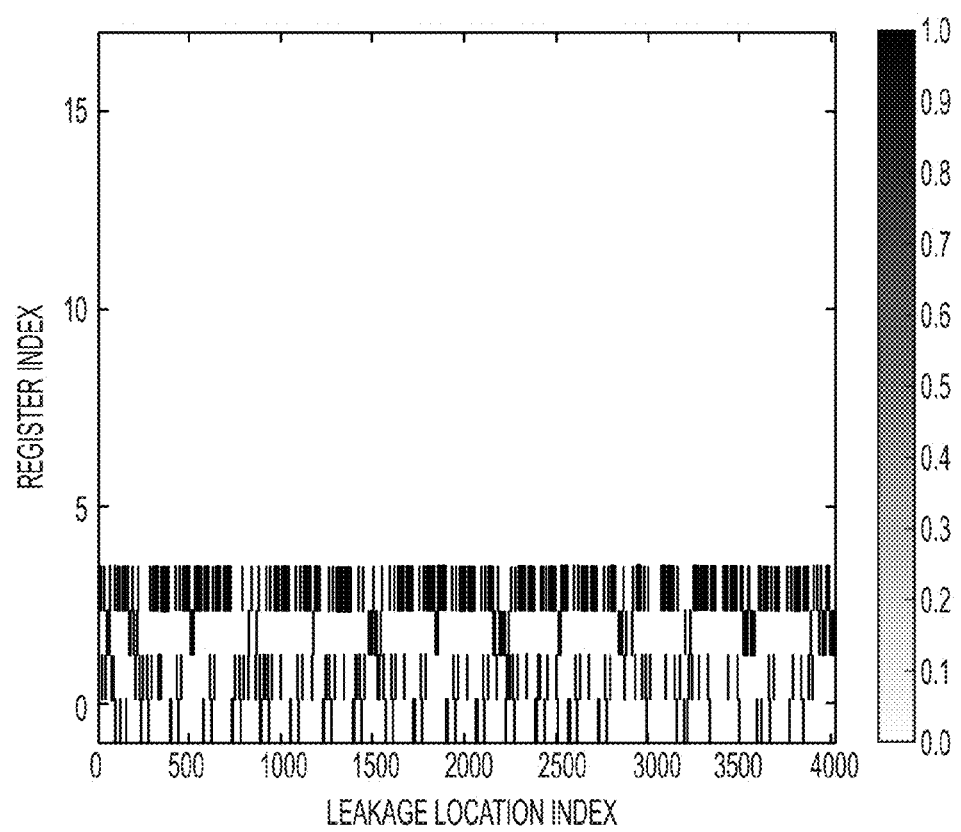
FIG. 8 is an illustration of side-channel leakage locations according to some embodiments.

Leakage timeline plots, shown in FIG. 8, according to some embodiments of the tool can provide a high-level view of system leakage over time. The example plot in FIG. 8 shows the leakage detected over the course of execution of a simple implementation of AES-256. Leakage was determined for each element of the simulated device's internal state—in this case, each register. The register index is given on the Y-axis and the CPU tick on the X-axis. No shading (white) represents no leakage (MI=0), black represents full leakage (MI=1), and shades of gray indicate partial leakage. This summary view shows which specific simulated device components of the machine state are leaking information and at what point during execution. In the example of FIG. 8, the leakage is confined to registers 0 through 3.

In addition to reporting the MI of each leakage location, the tool, according to some embodiments, stores the value of the program counter (PC) at each tick. This information is used to create a mapping from leakage locations to the instructions that caused them, which can then be visually presented as shown in FIG. 9. This view shows a section of disassembled binary with instructions that leak secret information highlighted. Each instruction line begins with the program counter and the number of times that instruction was executed. Since the same instruction can be executed at multiple points, and its operands may be different each time, this view reports the minimum, maximum, and average MI values yielded by that instruction across all ticks. Looking at the highlighted assembly, it is possible to identify the most vulnerable sections of the program and, if the binary was compiled with debugging enabled, the problems can be traced to the high-level source code.

Verification Against Hardware

Methods, according to some embodiments, can accurately predict side-channel leakage and can identify the source of SCA vulnerability for an application. Several experimental studies were conducted to compare results from side-channel leakage analyses, according to methods describes above, to results based on side-channel measurements on physical hardware. The hardware platform used in the experimental studies was a BeagleBone Rev A6—a small Linux board with a 720 MHz ARM Cortex-A8 processor running Angstrom Linux (this is a common development board for hobbyist work and prototyping). The Cortex-A8 processor core is used in many system-on-chips (SoCs) and consumer devices (e.g., smartphones), and more generally, the Cortex architecture is used in several mobile processors such as the Qualcomm Snapdragon and Samsung Exynos. The widespread use of this architecture makes it an interesting and relevant platform for embedded security research.

A generic leakage model, according to some embodiments, was used to conduct comparisons with the physical hardware tests. Results generated using this generic model represent the worst-case leakage scenario. For some tests, the electromagnetic (EM) side-channel was used because it is widely believed to be more powerful than others and because collection of EM data does not require any physical modifications of the physical system. The EM probe used in the collections was a Langer EMVTechnik near-field magnetic probe with a frequency range of 30 MHz to 3 GHz. The probe was positioned to maximize the EM energy observed during normal processing on the target system. A Detectus AB EMC-scanner was used to help identify the placement of the probe. EM traces were collected with a 14-bit ADC running at 400 MS/s, and later filtered with a 2 MHz bandpass filter centered around 50 MHz. This band was chosen based on the strength and structure of EM signals observed during cryptographic processing. A GPIO pin on the BeagleBone was used to trigger collections and ensure that samples within each trace could be mapped to the proper CPU instructions. This precise triggering also greatly improved trace alignment, which would otherwise be a significant source of noise. To further reduce noise and environmental effects, 10,000 traces were collected and averaged for each test.

Some embodiments of the side-channel analysis tool focus on leakage from registers. Therefore, tests were conducted to check whether the EM radiation from the Cortex-A8 was affected by register writes. To perform this test, an unprotected AES implementation was used so that leakages would not be hidden by side-channel countermeasures. The compiled binary for this implementation was run on the BeagleBone platform while measuring its EM emanations. This same binary was then loaded and executed in the Gem5 simulator while the number of register writes performed over a sliding time window was tracked by the side-channel analysis tool. Results from these measurements are shown in FIGS. 10A and 10B.

Figure 10A:
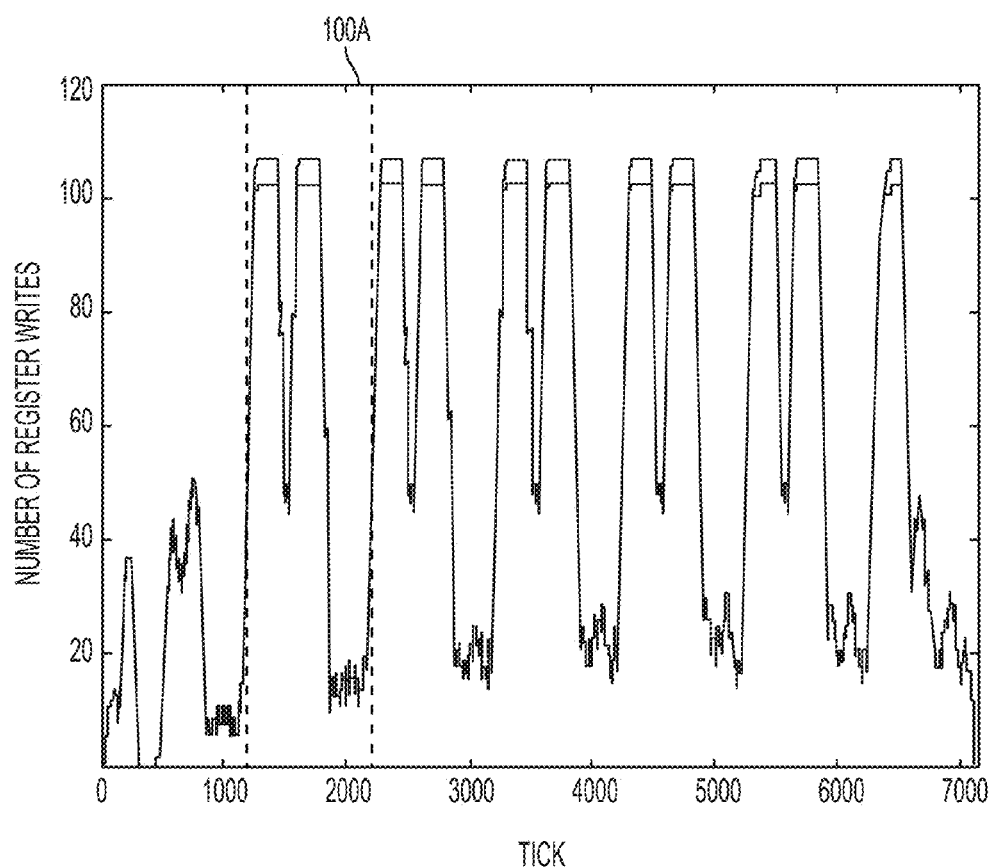
FIG. 10A is an illustration of predicted side-channel leakage according to some embodiments.

FIG. 10A provides the predicted EM leakage based on the results of the analysis tool, with the predicted EM leakage represented by the number of register write (changes in register values) at a given CPU clock tick. For example, looking at section 100A beginning near clock tick 1400, there is a peak of register writes of over 100. It would be predicted that the EM emanation from the physical hardware at this same clock tick would be increased.

Figure 10B:
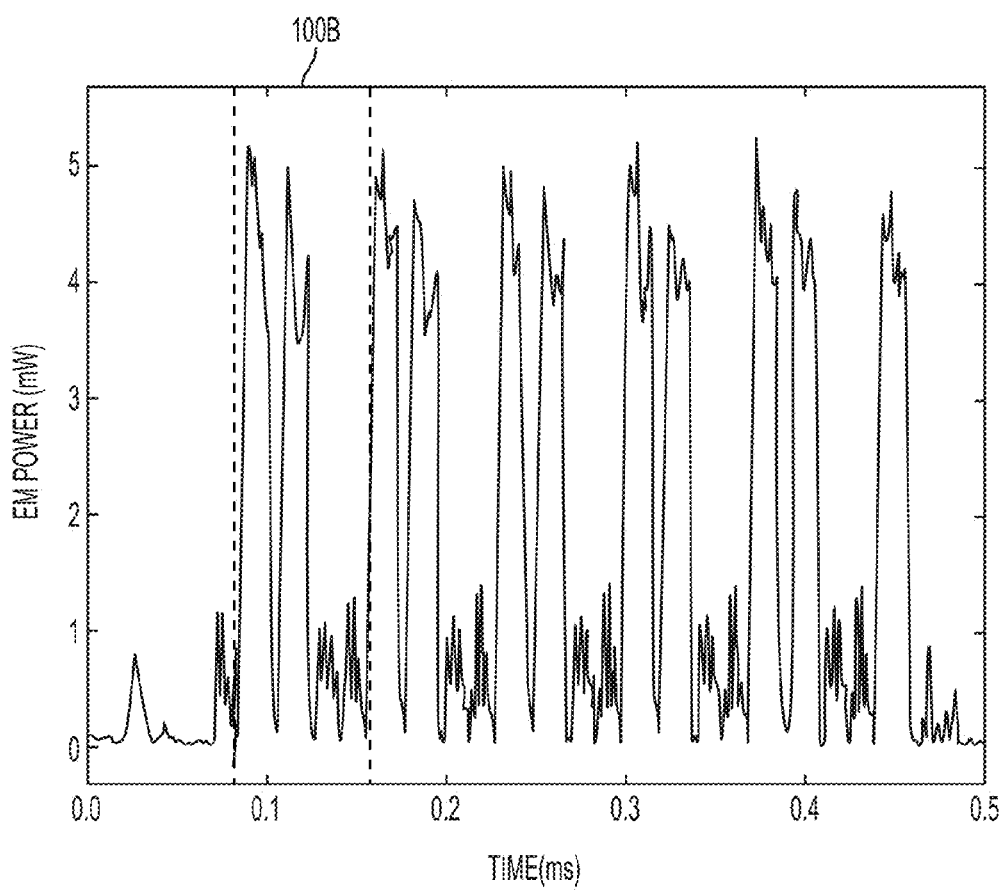
FIG. 10B is an illustration of average measured EM power emanation according to some embodiments.

FIG. 10B provides the averaged measured EM trace values. The x-axis is the time in milliseconds and the y-axis is the EM power in milli-Watts. Looking at section 100B, for example, and comparing it with section 100A, the measured EM trace values strongly correlate with the predictions. The leakage patterns are strongly correlated—two peaks followed by a valley followed by two peaks and so on. The relative leakage strength is also strongly correlated, with maximum register writes in the prediction correlating well with the maximum EM measurements. Timing is also strongly correlated with actual EM measurements. These correlations provide strong indications that the GEM 5 simulator used in the side-channel leakage analysis tool is accurately modeling the execution of the application and that register writes are a significant source of the observed EM leakage.

An application with masking functionality was analyzed according to embodiments described herein to test for the side-channel leakage analysis tool's ability to measure various masking strengths. A custom test application was designed to perform an s-box table lookup on a secret input value. This table lookup operation was protected with a boolean masking countermeasure (a random input). Multiple versions of this program with different levels of masking strength were generated by adjusting the distribution of the mask values. For example, where the mask is set to a constant value, the operation is effectively unmasked and, at the other extreme, if the mask is drawn from a uniform random distribution of all possible random inputs (e.g., all possible 8 bit mask values), then the operation is perfectly masked. For effective masking strengths between these extremes, the mask is drawn from a non-uniform random distribution. In this way, applications were generated with six different degrees of masking strength. Each application was analyzed with the side-channel leakage analysis tool, according to some embodiments, along with a traditional analysis of EM side-channel data, which was collected while running the target binary on the BeagleBone system.

Figure 11:
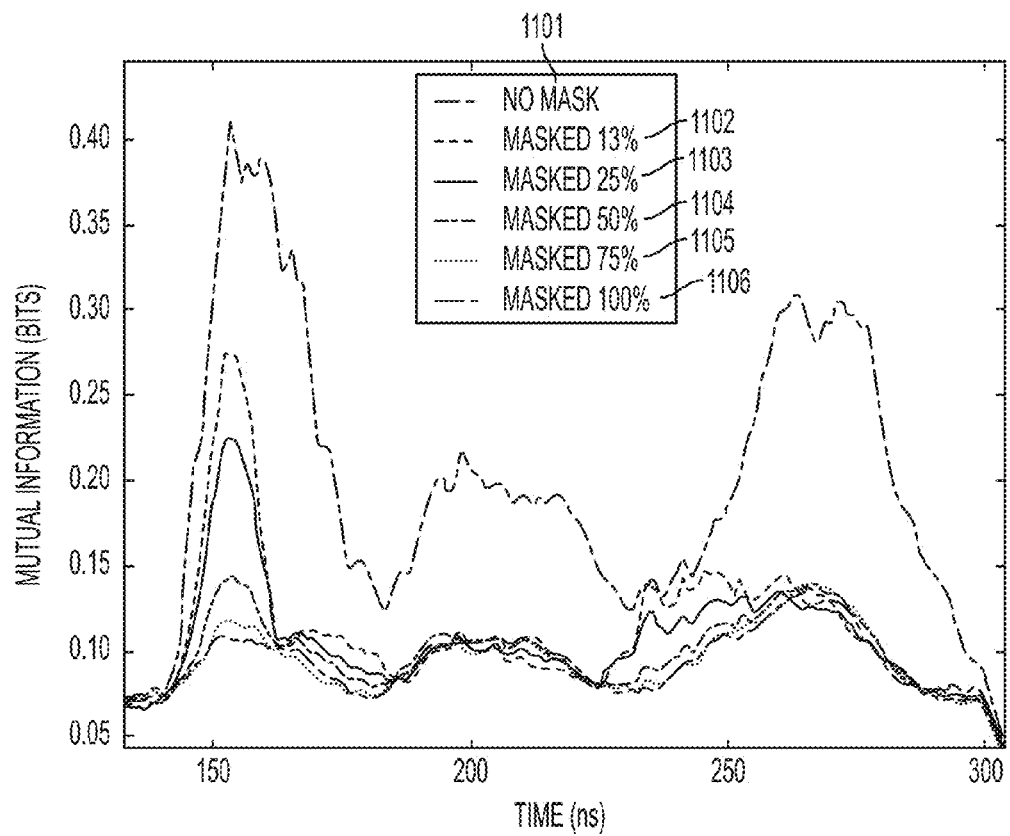
FIG. 11 is an illustration of EM leakage of S-Box lookups according to some embodiments.

The mutual information between the EM data and the secret value used in the s-box lookup as generated by the side-channel leakage analysis tool is shown in FIG. 11. As expected, the effectively unmasked version 1101 yielded the most information leakage and mask distributions closer to uniform random 1106 produced progressively less leakage.

Figure 12A:
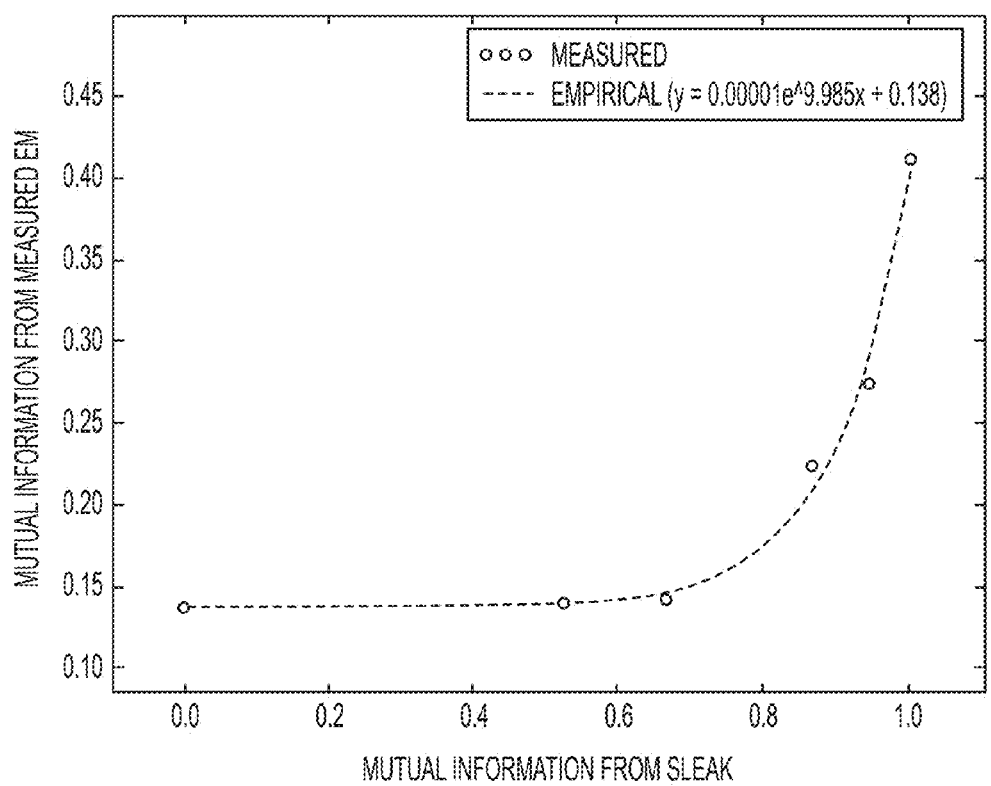
FIG. 12A is an illustration of a comparison between MI calculated with real EM measurements and predicted MI using a generic leakage model according to some embodiments.

FIG. 12A shows a comparison of the side-channel leakage analysis tool's MI results (x-axis) to the real EM leakage measured on the physical hardware (y-axis). In this comparison, the side-channel leakage analysis tool embodiment used a generic leakage model as described above (which is hardware agnostic and produces the worst-case scenario leakage predictions). Consequently, the predicted leakage is generally higher than the measured leakage and has an exponential relationship with it. This relationship highlights one of the advantages of using the side-channel leakage analysis tool according to embodiments described herein for vulnerability testing: the difference between perfectly masked (MI=0) and a mask with significant bias is exploitable, yet it is challenging to detect from measured EM leakage.

Figure 12B:
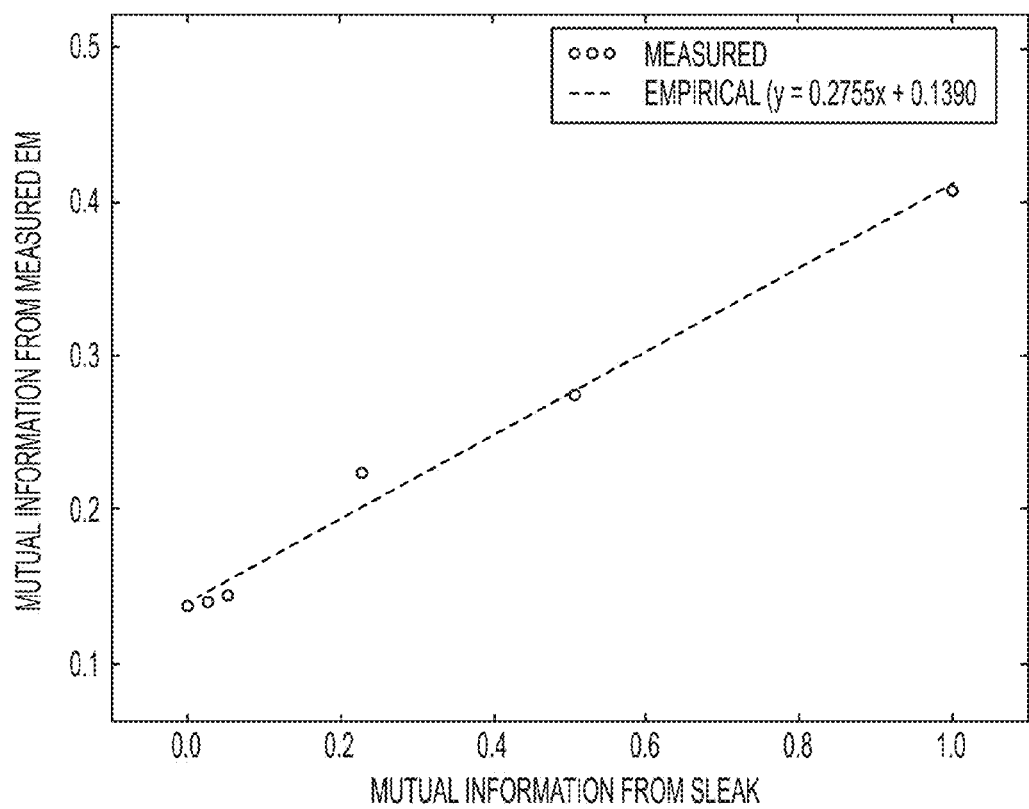
FIG. 12B is an illustration of a comparison between MI calculated with real EM measurements and predicted MI using a hamming weight leakage model according to some embodiments.

FIG. 12B shows the same plot, but with a side-channel leakage analysis tool according to some embodiments employing a Hamming-weight leakage model instead of the generic model. In this case, the predicted leakage is highly correlated to the measured leakage ($\rho$=0.976) and has a linear relationship. While this leakage model produces very accurate predictions for this particular hardware platform, it may be less accurate for other platforms. According to some embodiments, the side-channel leakage analysis tool includes multiple leakage models and provides results for each model, enabling comparison.

Figure 13:
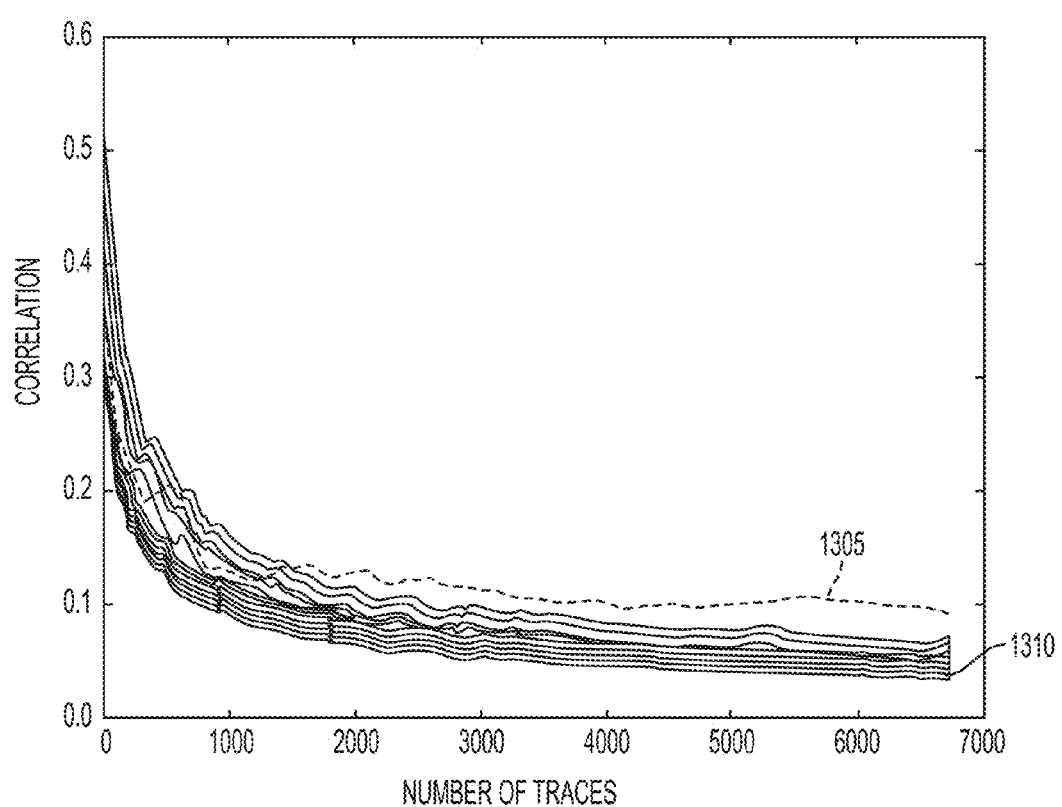
FIG. 13 is an illustration of the maximum correlation for each guess of an AES key-byte plotted against the number of traces according to some embodiments.

To verify that the leakage detected by the side-channel leakage analysis tool according to some embodiments is exploitable, a partial key extraction was performed on the unprotected implementation of AES-256 running on the BeagleBone, as described above. The results of a side-channel leakage analysis, according to some embodiments, were first analyzed to identify leakage locations (e.g., as shown in FIG. 8). Next, a side-channel attack was conducted at one of those leakage locations. A first-order correlation EM analysis (CEMA) attack was conducted. The results are summarized in FIG. 13. The incorrect key hypotheses 1310 are shown in gray and the correct key byte 1305 is shown in black. After roughly 2,000 traces, the key hypothesis represented by the black plot correlates significantly more than any other, revealing that it is the correct key. This successful attack demonstrates that the SCA vulnerabilities identified by SLEAK can be exploited through the EM side-channel, and used to extract bytes of the secret AES key.

Countermeasure Analysis

To verify the efficacy of side-channel leakage analysis methods, according to certain embodiments, for implemented countermeasures, two different AES implementations with countermeasures were tested—a differential power analysis (DPA) countermeasure and a custom boolean-masked version of AES. The DPA implementation used a sophisticated masking countermeasure called rotating s-box masking (RSM). The custom version used boolean masking and was intended to be completely secure against register-based leakage (e.g., as detected by some embodiments described herein). A side-channel leakage analysis according to some embodiments identified unexpected vulnerabilities in both implementations.

For testing, the RSM application was adapted to run on the BeagleBone's ARM processor (the original application targeted an AVR processor). The RSM countermeasure is a low entropy masking scheme (LEMS). The number of discrete mask values are a subset of the possible intermediate values that it protects. In particular, RSM uses only 16 mask values, hence the mask entropy of this scheme is 4 bits, while it is used to protect 8-bit intermediate values. Although it is known that any LEMS is only partially masked and therefore potentially vulnerable, the reduced entropy allows for more efficient implementations and, so, presents a trade-off between security and performance. As a result of the low-entropy mask, several leakage locations were detected by the side-channel leakage analysis, according to some embodiments, throughout the RSM implementation. Because the side-channel leakage analysis can provide an approximation of the amount of leakage at each location, locations with an acceptable level of leakage can be ignored and only those locations with higher-than-expected leakage can be selected for investigation. This allows the usage of some embodiments describes herein to search for more critical vulnerabilities in a given application (such as, e.g., the RSM implementation).

Application of the side-channel leakage analysis according to some embodiments also identified a second side-channel leakage in the RSM application, which manifests when leakage is a function of the two sequential values held in the same register. For example, if the initial register value is denoted $v_i$ and the value being written is denoted $v_f$, then the value that is leaked can be the delta between them: $v_i \oplus v_f$. Side-channel leakage analysis according to some embodiments can detect these vulnerabilities by calculating the MI with all three values for each register (the initial, final, and delta). Accordingly, the side-channel leakage analysis was able to identify leakage locations where the initial and final register values themselves do not leak any information but where the delta of the register does. This vulnerability would likely go undetected by an analysis of the target at the (IR) level because, at that level, the compiler has not yet determined which registers will be used to store intermediate results. Therefore, it is impossible to determine at the IR-level which two values will be placed into the same register to create a vulnerable register delta.

Figure 14A:
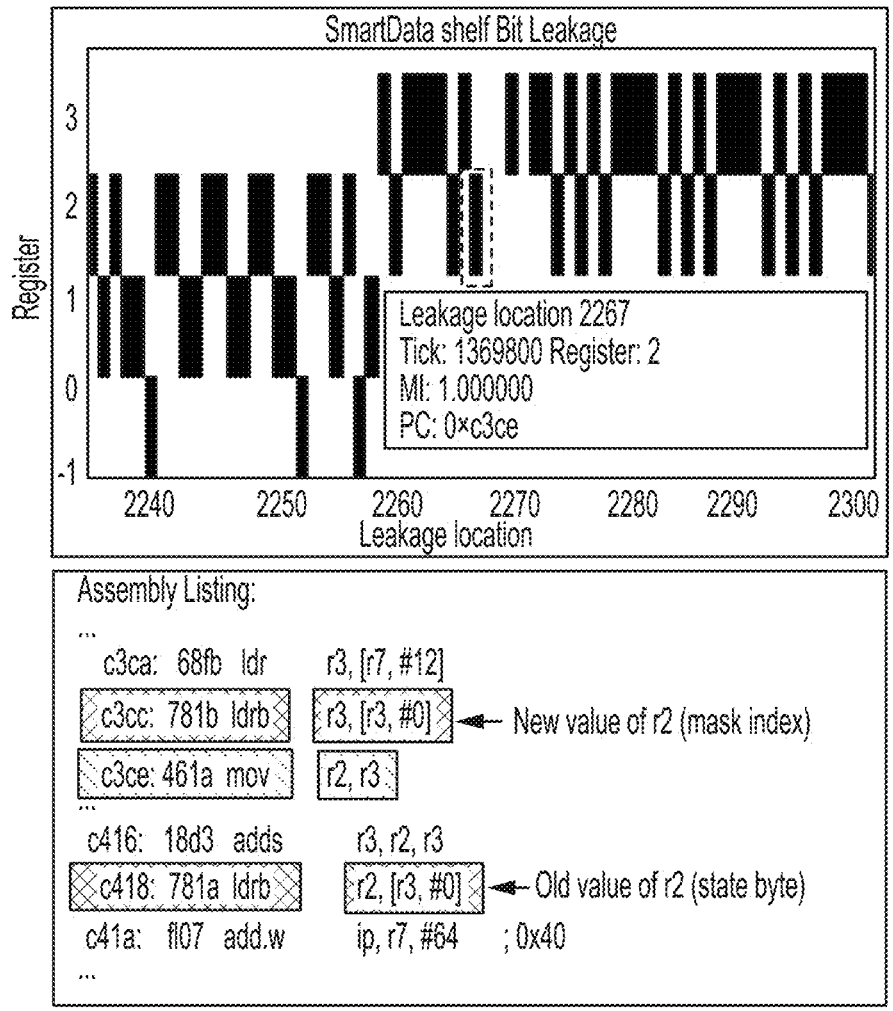
FIG. 14A is an illustration of identifying the source of leakage according to some embodiments.

FIG. 14A shows the output of the side-channel leakage analysis tool according to some embodiments for one of these leakage locations and the assembly and C codes of the leaking instruction. At this leakage location, the register contained the starting mask index (the random value that provides the mask entropy) and was overwritten with a masked value. This caused the delta to be dependent on both the mask and the masking index, effectively allowing an attacker to see both values simultaneously. The value of this leakage location is equivalent to $v \oplus m \oplus m$ for an intermediate value, v, and mask m. Since $m \oplus m$ is identity, the mask is canceled out and v is exposed.

In mapping the assembly instruction that caused this identified leakage to the IR or to the original C source code, as shown in FIG. 14A, there is no indication that this collision could occur. The fact that it did occur is wholly dependent on the register allocation chosen by the compiler backend. By analyzing the actual binary instead of higher-level representations, side-channel leakage analyses according to some embodiments are able to detect such vulnerabilities.

For the custom implementation of AES, which uses boolean masking that removes most of the leakage (but not all), application of the side-channel leakage analysis according to some embodiments still detected leakage locations that occurred within a "memcpy" call. In the LLVM IR of the binary, memcpy is a single intrinsic function, which is a built-in function that LLVM expands at a later compilation stage:

call void @llvm. memcpy. p0i8. p0i8. i32 (i8*%2, i8*%3, i32 16, i32 1, it false)

FIG. 14B shows a portion of the expansion for this single line of IR into several ARM assembly instructions. The instructions that leak are highlighted. This code loads multiple bytes into one register and writes them all to memory at once. While this is a good performance optimization, it potentially nullifies the masking countermeasure. Before being written, the register contained four intermediate values, all masked with the same mask. Effectively, this code creates a 32-bit value that still uses a mask with only eight bits of entropy. Like the mask cancellation vulnerability, there was no indication in either the C source code or the IR that this vulnerability existed. The implementation of an intrinsic function can be significantly different across different target platforms. In general, intrinsic functions cannot be evaluated for leakage at the IR-level because they are a black box. In other words, the fully-compiled binary is preferably analyzed to ensure that the lowering of intrinsic functions does not introduce vulnerabilities.

Data Dependent Branching

Figure 15:
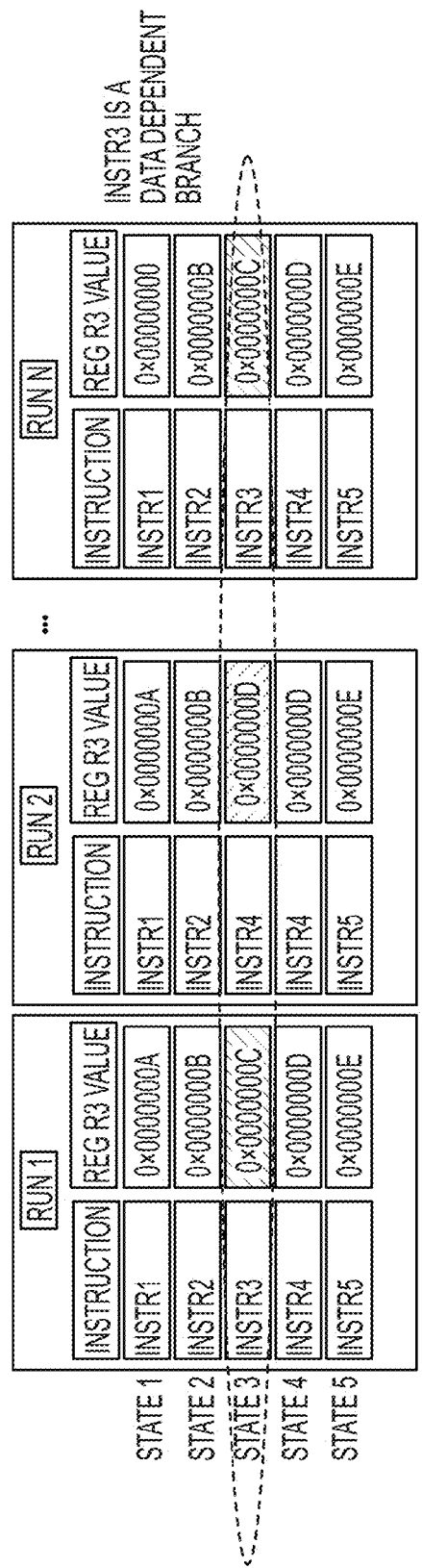
FIG. 15 is illustration of intermediate values for an algorithm with data dependent branching according to some embodiments.

Data dependent branches exist in some cryptographic algorithms and may present a vulnerability to SCA. Data dependent branches are created by an algorithm taking different paths through the source code given different plaintext or encryption key inputs. An example of a data dependent branch is provided in FIG. 15. As in FIG. 7, the intermediate values for register R3 are provided for 5 instruction steps across three runs. Each run represents a unique combination of inputs. For example, a unique combination of a public input, a random input, and a secret input. To further illustrate, Run 1 may be based on a given public input, a given random input, and a given secret bit set to 0, Run 2 may be based on the public input, the random input, and the secret bit set to 1, and Run N may be based on the public input, a different random input, and the secret bit set to 0. As illustrated by FIG. 15, the order of instructions varies between runs. For example, the third instruction in Run 1 and Run N is INSTR3, while the third instruction in Run 2 is INSTR4. Therefore, the third instruction is a data dependent branch. If the decision to take any branch within the algorithm contains mutual information with the algorithm's secret inputs, there is side-channel leakage of secret input information that an attacker could discover and exploit.

It is not always the case that the existence of data dependent branches indicates an insecure algorithm. Using simulation to analyze data dependent branch leakage in a systematic way may not be a straight forward task. This is because different algorithms exhibit different kinds of branching behavior. Additionally, every processor family exhibits unique types of branching instructions and unique lowering procedures in the compiler back ends to generate the branch instructions. It is also difficult to anticipate every technique that an attacker could use to exploit mutual information in data dependent branches. According to some embodiments, side-channel leakage analysis methods employ reasonable assumptions about attacker behavior in exploiting data dependent branching. These methods can highlight to an application developer which branches in their application present side-channel leakage risk. Furthermore, methods according to some embodiments can also show the relative degree of risk associated with each branch. Leakage information provided by some embodiments is not practical to find using static analysis of either the higher level software or the compiled assembly language.

Examples of branching are present in many cryptographic algorithms. For example, in elliptic curve cryptography (ECC), numbers are too large (160 bits) to be represented by the platform architecture (32 bits). The carry operation during addition requires a branch. The data encryption standard (DES) encryption algorithm includes the branch Z=((X==0) II (Y==0)). In ARM architectures, the instruction pair MOVCC and MOVCS is a branch in which a C-coder cannot control which instructions will be chosen. This branch can appear in encryption applications executed on ARM-based hardware.

According to some embodiments, side-channel leakage analysis ignores data dependent branches by aligning simulated device states from one run to the next by time. For example, the intermediate values of Register 3 at time t=1 second for a first run is aligned with the intermediate value of Register 3 at time t=1 second for a second run even where the instructions responsible for the value of the Register in Run 2 is different from the instruction in Run1.

Figures 16A, 16B:
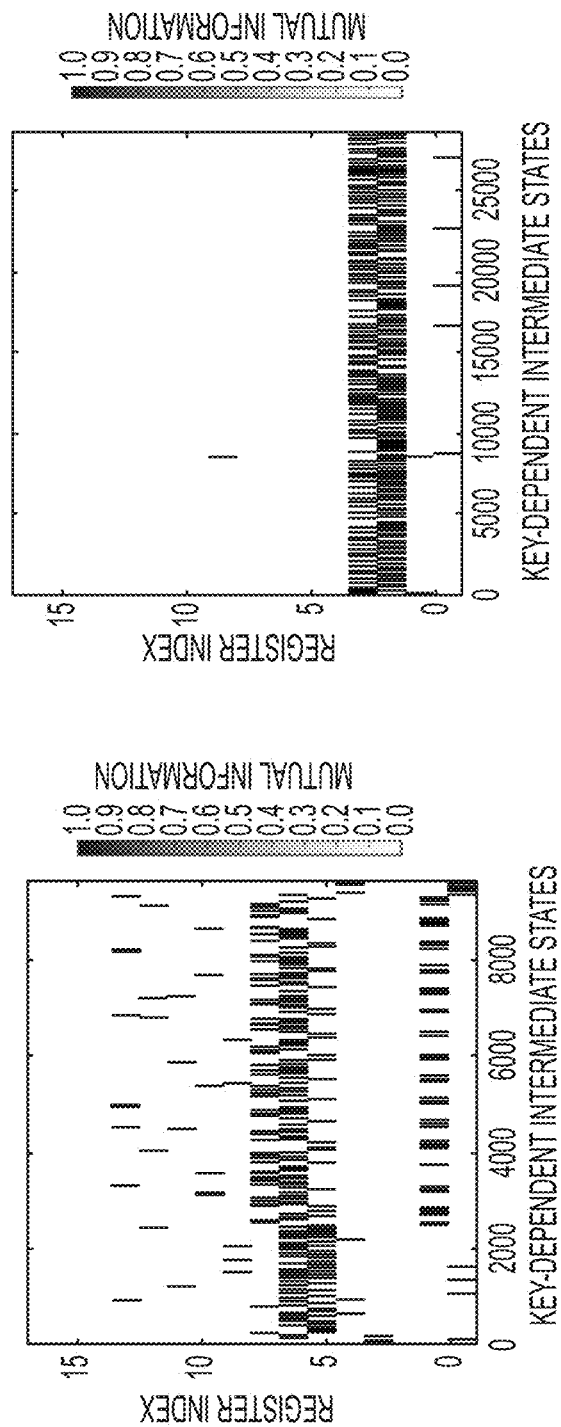
FIG. 16A is an illustration of side-channel leakage locations for an algorithm employing the Data Encryption Standard according to some embodiments.
FIG. 16B is an illustration of side-channel leakage locations for an algorithm employing Elliptic Curve Cryptography according to some embodiments.

According to some embodiments, side-channel analysis determines which assembly instructions correspond to each other between runs by aligning traces by program counter. FIGS. 16A and 16B show leakage occurring from the general purpose registers R0-R15 for the DES algorithm (FIG. 16A) and for the ECC algorithm (FIG. 16B). As illustrated, in DES the leakage is most prevalent in registers 1, 5, 6, and 7. For ECC, the leakage is most prevalent in registers 2 and 3.

According to some embodiments, the side-channel leakage analysis includes convergence functionality that detects convergence of the calculated dependency of a location on a secret input and adjusts the number of runs to achieve an optimal balance between speed and accuracy of the analysis. This convergence functionality can enable faster computation times by reducing the number of runs executed. In determining dependency of a location on a secret input (e.g., in calculated the MI), the greater the number of comparison points, the better the calculated dependency reflects an actual dependency (i.e., the higher the confidence). The highest confidence analysis would execute runs over all public inputs and all random inputs. However, such an analysis is computationally intensive and, therefore, time and cost intensive. As the number of comparison points increases (the number of runs increase), however, the calculated dependencies may begin to converge. Once the values have sufficiently converged, the benefit of additional runs is outstripped by the computational cost (time cost) and the analysis can be completed with a high degree of confidence in the calculated dependencies without iterating over all possible inputs.

Figure 17:
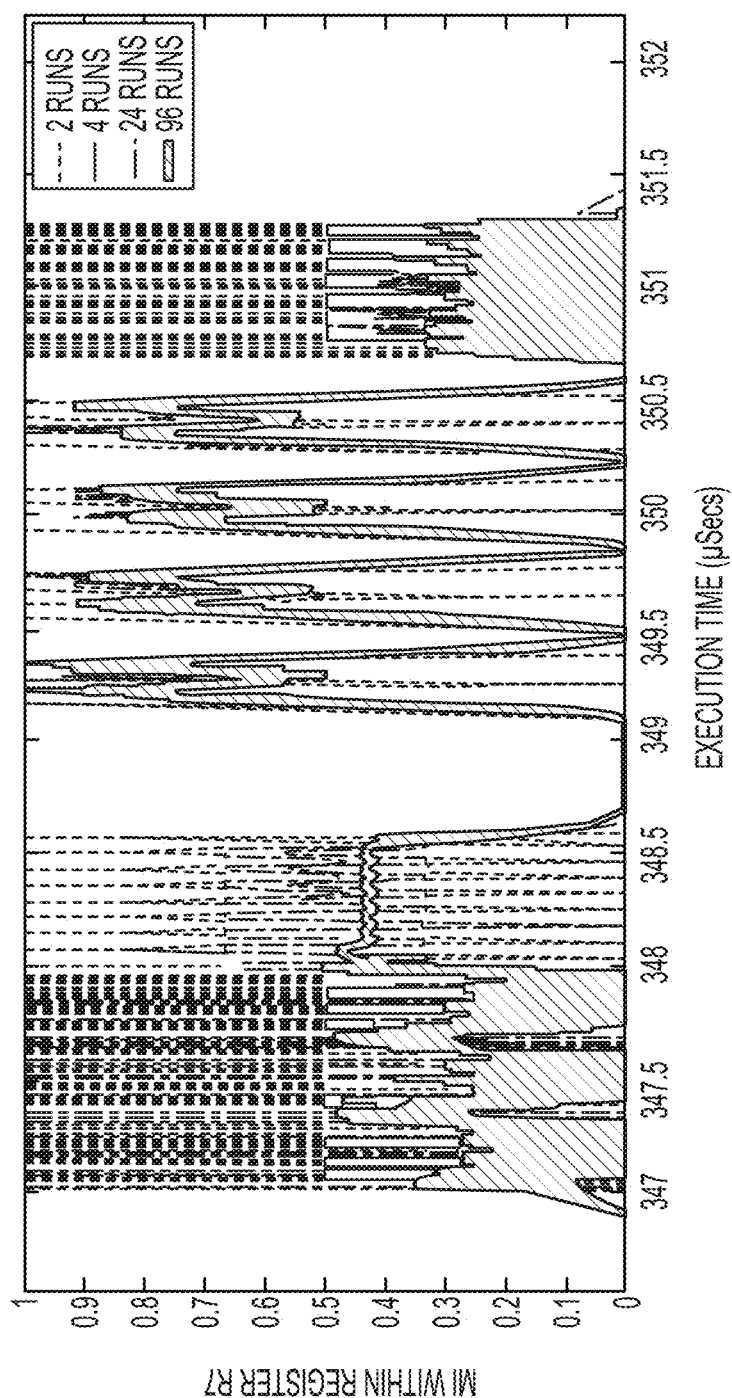
FIG. 17 is an illustration of the convergence of mutual information over multiple runs according to some embodiments.

FIG. 17 provides an example of the convergence of the calculated MI, according to some embodiments, for Register 7 over a period of execution time. As shown, when MI is calculated using only two data points (two runs, line 1702), the variability is high. As the number of runs increases, the calculated MI converges and the variability from one execution step to the next reduces. For example, the line representing 24 runs (1706) and the line representing 96 run (1708) begin to match.

According to some embodiments, the side-channel leakage analysis detects the convergence of the calculated dependencies and exits the analysis, for example, by comparing the dependency values of one run to previous runs. According to some embodiments, the side-channel leakage analysis executes the application and extracts intermediate values for a first set of input combinations (for example, runs are executed over all public inputs, random inputs, and secret inputs from a random sample of public inputs, random inputs, and secret inputs) and determines a first set of dependencies of locations on the secret inputs. The analysis then executes the application and extracts intermediate values for a second set of input combinations and determines a second set of dependencies. The analysis then computes a delta between the dependencies of the second set and the dependencies of the first set. If the delta is below a certain threshold that indicates sufficient convergence, the analysis exits. However, if the convergence is insufficient, the analysis generates a third set of dependencies and compares the third set to the second set. This process can continue until the convergence threshold is reached.

Described above are methods, systems, and devices for testing software application for SCA vulnerabilities in a fast, inexpensive, and automated manner. Embodiments can be used by software developers without expertise in side-channel security.

Some embodiments can produce results that account for platform-specific leakage characteristics and compiler effects without the need for physical hardware or side-channel traces. Some embodiments can evaluate leakage sources, such as registers, memories, and caches. Some embodiments have been experimentally verified to correctly discern between different levels of mask strength to identify intermediate values that can leak information and accurately identify simulated device components that generate leakage and when the leakage occurs. By tracing these leakage locations to their corresponding assembly and source code instructions, SCA analysis tools, according to some embodiments, are able to identify real-world cases where high-level code and IR is secure, but has vulnerabilities introduced during the compiler's final stages.

Described embodiments can reduce the cost of verifying the security of software implementations. Embodiments can be utilized early in the development cycle of a software application when it is easier to fix vulnerabilities. The capabilities provided by the described embodiments are increasingly important in the face of the ever decreasing cost and difficulty of performing side-channel attacks.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

What is claimed as new and desired to be protected by Letters Patent of the United States is:

1. A method for analyzing side-channel leakage of an application running on a device comprising:
  loading the application on a system comprising a device simulator, wherein the application is configured to accept public inputs and secret inputs;
  generating using the device simulator a simulated device by simulating hardware of the device;

selecting a set of public inputs;
for each public input in the set of public inputs:
executing the application on the simulated device based on a respective public input and a first value for a secret input and extracting first intermediate values of a simulated device component of the simulated device, and
executing the application on the simulated device based on the respective public input and a second value for the secret input and extracting second intermediate values of the simulated device component of the simulated device;
determining an amount of dependency of a value of a location of the simulated device on the secret input based on a plurality of the first intermediate values and a plurality of the second intermediate values, wherein the location comprises the simulated device component at an execution time; and
when the amount of dependency is determined to be a non-zero number, determining that the location of the simulated device is vulnerable to a side-channel leakage detection.

2. The method of claim 1, wherein the application is configured to encrypt the public inputs based on the secret inputs.

3. The method of claim 1, wherein the application comprises executable machine code.

4. The method of claim 1, wherein the simulated device comprises a simulated processor of the device.

5. The method of claim 1, wherein the secrets inputs comprise an encryption key.

6. The method of claim 1, wherein the public inputs comprise plaintext.

7. The method of claim 1, wherein the set of public inputs comprises a random sample of public inputs.

8. The method of claim 1, wherein:
the first intermediate values comprise a first value of the simulated device component at the execution time, and
the second intermediate values comprise a second value of the simulated device component at the execution time.

9. The method of claim 1, wherein the execution time is a clock cycle or an instruction step.

10. The method of claim 1, wherein determining an amount of dependency of a value of a location of the simulated device on the secret input comprises calculating a Mutual Information Value between the location and the secret input.

11. The method of claim 1, wherein:
the application is configured to accept random inputs;
executing the application on the system based on a respective public input and a first value for a secret input comprises executing the application on the system based on a respective public input, a random input, and a first value for a secret input; and
executing the application on the system based on the respective public input and a second value for the secret input comprises executing the application on the system based on the respective public input, the random input, and a second value for the secret input.

12. The method of claim 11, wherein the random input comprises a side-channel leakage countermeasure.

13. The method of claim 1, comprising:
mapping the location to an instruction in the application; and
when the location is determined to be vulnerable to the side-channel leakage detection, identifying the instruction in the application as being vulnerable to a side-channel attack.

14. The method of claim 1, wherein a device component being simulated comprises: a register, a memory bank, a cache, a CPU flag, a CPU pipeline, a power consumption, electromagnetic radiation, or acoustic radiation.

15. A system for analyzing side-channel leakage of an application running on a device comprising:
a device simulator configured to:
generate a simulated device by simulating hardware of the device;
one or more processors;
memory; and
one or more programs, wherein the one or more programs are stored in the memory and configured to be executed by the one or more processors, the one or more programs including instructions for:
loading the application on the device simulator, wherein the application is configured to accept public inputs and secret inputs;
selecting a set of public inputs;
for each public input in the set of public inputs:
executing the application on the simulated device based on a respective public input and a first value for a secret input and extracting first intermediate values of a simulated device component of the simulated device, and
executing the application on the simulated device based on the respective public input and a second value for the secret input and extracting second intermediate values of the simulated device component of the simulated device;
determining an amount of dependency of a value of a location of the simulated device on the secret input based on a plurality of the first intermediate values and a plurality of the second intermediate values, wherein the location comprises the simulated device component at an execution time; and
when the amount of dependency is determined to be a non-zero number, determining that the location of the simulated device is vulnerable to a side-channel leakage detection.

16. The system of claim 15, wherein the application is configured to encrypt the public inputs based on the secret inputs.

17. The system of claim 15, wherein the application comprises executable machine code.

18. The system of claim 15, wherein the simulated device comprises a simulated processor of the device.

19. The system of claim 15, wherein the secrets inputs comprise an encryption key.

20. The system of claim 15, wherein the public inputs comprise plaintext.

21. The system of claim 15, wherein the set of public inputs comprises a random sample of public inputs.

22. The system of claim 15, wherein:
the first intermediate values comprise a first value of the simulated device component at the execution time, and
the second intermediate values comprise a second value of the simulated device component at the execution time.

23. The system of claim 15, wherein the execution time is a clock cycle or an instruction step.

24. The system of claim 15, wherein determining an amount of dependency of a value of a location of the simulated device on the secret input comprises calculating a Mutual Information Value between the location and the secret input.

25. The system of claim 15, wherein:
the application is configured to accept random inputs;
executing the application on the system based on a respective public input and a first value for a secret input comprises executing the application on the system based on a respective public input, a random input, and a first value for a secret input; and
executing the application on the system based on the respective public input and a second value for the secret input comprises executing the application on the system based on the respective public input, the random input, and a second value for the secret input.

26. The system of claim 25, wherein the random input comprises a side-channel leakage countermeasure.

27. A non-transitory computer readable storage medium storing one or more programs for analyzing side-channel leakage of an application running on a device, the one or more programs comprising instructions, which when executed by an electronic system comprising a device simulator, cause the system to:
load the application on the system comprising the device simulator, wherein the application is configured to accept public inputs and secret inputs;
generate using the device simulator a simulated device by simulating hardware of the device;
select a set of public inputs;
for each public input in the set of public inputs:
execute the application on the simulated device based on a respective public input and a first value for a secret input and extracting first intermediate values of a simulated device component of the simulated device, and
the application on the simulated device based on the respective public input and a second value for the secret input and extracting second intermediate values of the simulated device component of the simulated device;
determine an amount of dependency of a value of a location of the simulated device on the secret input based on a plurality of the first intermediate values and a plurality of the second intermediate values, wherein the location comprises the simulated device component at an execution time; and
when the amount of dependency is determined to be a non-zero number, determine that the location of the simulated device is vulnerable to a side-channel leakage detection.

28. The non-transitory computer readable storage medium of claim 27, wherein the application is configured to encrypt the public inputs based on the secret inputs.

29. The non-transitory computer readable storage medium of claim 27, wherein the application comprises executable machine code.

30. The non-transitory computer readable storage medium of claim 27, wherein the simulated device comprises a simulated processor of the device.

31. The non-transitory computer readable storage medium of claim 27, wherein the public inputs comprise plaintext.

32. The non-transitory computer readable storage medium of claim 27, wherein the set of public inputs comprises a random sample of public inputs.

33. The non-transitory computer readable storage medium of claim 27, wherein:
the first intermediate values comprise a first value of the simulated device component at the execution time, and
the second intermediate values comprise a second value of the simulated device component at the execution time.

34. The non-transitory computer readable storage medium of claim 27, wherein the execution time is a clock cycle or an instruction step.

35. The non-transitory computer readable storage medium of claim 27, wherein determining an amount of dependency of a value of a location of the simulated device on the secret input comprises calculating a Mutual Information Value between the location and the secret input.

36. The non-transitory computer readable storage medium of claim 27, wherein:
the application is configured to accept random inputs;
executing the application on the system based on a respective public input and a first value for a secret input comprises executing the application on the system based on a respective public input, a random input, and a first value for a secret input; and
executing the application on the system based on the respective public input and a second value for the secret input comprises executing the application on the system based on the respective public input, the random input, and a second value for the secret input.

37. The non-transitory computer readable storage medium of claim 36, wherein the random input comprises a side-channel leakage countermeasure.

* * * * *